(12) United States Patent  
Aoyama et al.

(10) Patent No.: US 7,180,490 B2  
(45) Date of Patent: Feb. 20, 2007

(54) LIQUID CRYSTAL DISPLAY APPARATUS

(75) Inventors: Tetsuya Aoyama, Kawagoe (JP); Shinichi Komura, Hitachi (JP); Yuka Utsumi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/055,484

(22) Filed: Feb. 11, 2005

(65) Prior Publication Data

US 2005/0140620 A1   Jun. 30, 2005

Related U.S. Application Data

(63) Continuation of application No. 09/938,619, filed on Aug. 27, 2001, now Pat. No. 6,859,194.

(30) Foreign Application Priority Data

Mar. 29, 2001   (JP)   ............... 2001-094550

(51) Int. Cl.
*G09G 3/36* (2006.01)
*G09G 3/20* (2006.01)

(52) U.S. Cl. ................... 345/87; 345/90; 349/41; 349/56

(58) Field of Classification Search ............. 345/87, 345/90, 91, 92, 93, 103; 349/139, 141, 41, 349/56

See application file for complete search history.

(56) References Cited

U.S. PATENT DOCUMENTS

| 4,345,249 | A | * | 8/1982 | Togashi ................. 345/103 |
| 5,748,276 | A | * | 5/1998 | Uno et al. .............. 349/144 |
| 5,859,677 | A |   | 1/1999 | Watanabe |
| 5,870,075 | A |   | 2/1999 | Yamazaki |
| 6,525,798 | B1 | * | 2/2003 | Yamakita et al. ........ 349/141 |

FOREIGN PATENT DOCUMENTS

| JP | 63-21907 | 5/1988 |
| JP | 6-160878 | 6/1994 |
| JP | 9-297299 | 11/1997 |
| WO | WO91/10936 | 7/1991 |

* cited by examiner

*Primary Examiner*—Dennis-Doon Chow
(74) *Attorney, Agent, or Firm*—Antonelli, Terry, Stout and Kraus, LLP.

(57) ABSTRACT

A liquid crystal display apparatus includes a substrate and a second substrate with a liquid crystal layer sandwiched therebetween. A plurality of pixels are sandwiched between the two substrates and form a display section, each of the pixels is provided with first and second pixel electrodes both corresponding to the pixel, and a common electrode corresponding to the first and second pixel electrodes.

4 Claims, 22 Drawing Sheets

LIQUID CRYSTAL DISPLAY APPARATUS

CROSS REFERENCE TO RELATED APPLICATION

This application is a continuation of U.S. application Ser. No. 09/938,619, filed Aug. 27, 2001, now U.S. Pat. No. 6,859,194, the contents of which are incorporated herein by reference.

BACKGROUND OF THE INVENTION

The present invention relates to a liquid crystal display apparatus having a new configuration.

Conventional liquid crystal display apparatuses employ a display mode represented by a Twisted Nematic (TN) display mode and in which electric fields are applied substantially perpendicularly to a substrate surface (these electric fields are hereinafter referred to as "vertical fields"). The TN display mode, however, has the disadvantage of using a small angle of visibility.

On the other hand, an In-Plane Switching (IPS) display mode has been proposed in JP-B-63-21907, U.S. Pat. No. 4,345,249, WO No. 91/10,936, and JP-A-6-160878 and etc. specifications.

In this IPS display mode, an electrode for driving liquid crystals is formed on one of a pair of substrates that sandwiches the liquid crystals therebetween, and electric fields substantially parallel with a surface of the substrate (these electric fields are hereinafter referred to as "horizontal fields") are applied to the liquid crystals. This display mode provides a larger angle of visibility than the TN display mode.

FIG. 2 is a schematic sectional view showing an example of a configuration of a pixel portion of a liquid crystal display apparatus using the IPS display mode. The liquid crystal display apparatus has a substrate 1, a substrate 2 arranged opposite the substrate 1, a liquid crystal layer 12 sandwiched between the substrates 1 and 2, common electrodes 3 and pixel electrodes 4 for applying horizontal fields, insulated films 6a and 6b disposed on the substrate 1, a liquid-crystal orientation control layer 7 (hereinafter referred to as an "orientation film") disposed on the insulated film 6b, a color filter 8 and an orientation film 7 disposed on the substrate 2, and polarizing plates 11 disposed on surfaces of the substrates 1 and 2 which do not face the liquid crystals, the polarizing plates having their own optical characteristics varied according to an orientation state of the liquid crystals. The common electrodes 3 and 4 are linear and are arranged substantially in parallel.

In the IPS display mode, the common electrodes 3 and the pixel electrodes 4 generate horizontal fields as shown by equipotential lines in FIG. 2. Images are displayed when these fields cause the liquid crystals to rotate within a plane substantially parallel with the substrate 1.

SUMMARY OF THE INVENTION

There are now needs for a display monitor that can reliably reproduce colors, but the above described IPS display mode is disadvantageous in that color tones vary depending on a driving voltage.

Means for solving this problem has been reported in JP-A-9-297299 specification. The means reported in this publication, however, solves the problem with a combination of a light source and a liquid crystal panel. Thus, to widen a range of light sources any of which are to be selected, a means is desirable which restrains a variation in color tones using only the liquid crystal panel.

Further, the means reported in JP-A-9-297299 specification desirably sets a retardation $d_{eff} \cdot \Delta n_{eff}$ at a small value of 250 nm or less (where $d_{eff}$ denotes an effective thickness of the liquid crystal layer and $\Delta n_{eff}$ denotes an effective refractive-index anisotropy of the liquid crystals). This setting requires a gap and the refractive-index anisotropy to be reduced. A reduction in the gap may lower productivity, while a reduction in refractive-index anisotropy narrows the range of liquid crystals any of which are to be selected. Thus, solving these problems requires a means that does not substantially restrict the retardation.

It is an object of the present invention to provide a liquid crystal display apparatus having a new configuration and which restrains a variation in color tones on a display panel depending on a driving voltage without any unreasonable restrictions on retardation, using only the liquid crystal panel.

The present invention, adapted to attain the above object, will be described below in brief.

[1] A liquid crystal display apparatus having a first substrate, a second substrate arranged opposite the first substrate, a liquid crystal layer sandwiched between the first substrate and the second substrate, and a plurality of pixels forming a display section, in which each of the pixels is provided with a first pixel electrode and a second pixel electrode both corresponding to the pixel, and a common electrode corresponding to the first and second pixel electrodes.

[2] A liquid crystal display apparatus having a first substrate, a second substrate arranged opposite the first substrate, a liquid crystal layer sandwiched between the first substrate and the second substrate, and a plurality of pixels forming a display section, in which each of the pixels has a first and a second pixel electrodes each corresponding to the pixel and disposed on the first substrate, and a common electrode corresponding to the first and second pixel elements and disposed on the first substrate.

The first and second pixel electrodes can desirably provide each of the pixels with a corresponding potential.

The apparatus desirably includes a first signal driver for supplying a potential to the first pixel electrodes, a second signal driver for supplying a potential to the second pixel electrodes, and a signal control circuit for controlling signals transmitted to the first and second signal drivers.

[3] A liquid crystal display apparatus in which the first pixel electrodes, the common electrodes, and the second pixel electrodes are disposed on the first substrate.

In each pixel, the first pixel electrode and the common electrode may be linear and may be arranged substantially in parallel, and the second pixel electrode may be located between the first pixel electrode and the common electrode.

In this case, when a difference between the potentials provided to the first pixel electrode and to the common electrode is largest or smallest, the potential provided to the second pixel electrode is desirably substantially equal to an average of the potentials provided to the first pixel electrode and to the common electrode.

Furthermore, desirably, plural pieces of the first pixel electrode arranged in each pixel are connected together via a first junction, plural pieces of the second pixel electrode arranged in each pixel are connected together via a second junction, the plural pieces of the first pixel electrode and the first junction do not overlap the plural pieces of the second pixel electrode and the second junction, the first pixel electrode, the second pixel electrode, the first signal line, and the second signal line are arranged in the same layer, and the common electrode and scan line are arranged in the same layer.

Further, at least part of the second pixel electrode may overlap the first pixel electrode or the common electrode, the second pixel electrode may be linear, the second pixel electrode may be as wide as or narrower than the first pixel electrode or common electrode, which is overlapped by the part of the second pixel electrodes, the second pixel electrode may be linear, and the second pixel electrode may be wider than the first pixel electrode or common electrode, which is overlapped by the part of the second pixel electrode.

In this case, when the difference between the potentials provided to the first pixel electrode and to the common electrode is largest or smallest, the potential provided to the second pixel electrode desirably substantially equals the potential provided to either the first pixel electrode or the common electrode.

Furthermore, desirably, the plural pieces of the first pixel electrode arranged in each pixel are connected together via a first junction, the plural pieces of the second pixel electrode arranged in each pixel are connected together via a second junction, the plural pieces of the first pixel electrode and the first junction do not overlap the plural pieces of the second pixel electrode and the second junction, the first pixel electrode, the second pixel electrode, the first signal line, and the second signal line are arranged in the same layer, and the common electrode and scan line are arranged in the same layer.

Further, the first pixel electrode and the common electrode may be linear and may be arranged substantially in parallel, the second pixel electrode may be located below the first pixel electrode and the common electrode, the second pixel electrode overlaps the first pixel electrode and the common electrode, and insulated films may be disposed between the second pixel electrode and the first pixel electrode and between the second pixel electrode and the common electrode.

In this case, when the difference between the potentials provided to the first pixel electrode and to the common electrode is largest or smallest, the potential provided to the second pixel electrode is desirably substantially equal to the average of the potentials provided to the first pixel electrode and to the common electrode.

Further, the first and second pixel electrodes may be linear and may be arranged substantially in parallel, the common electrode may be located between the first pixel electrode and the second pixel electrode, at least part of the common electrode may overlap the first pixel electrode or the second pixel electrode, the first and second pixel electrodes may be linear and may be arranged substantially in parallel, the common electrode may be located below the first and second pixel electrodes, the common electrode overlaps the first and second pixel electrodes, and insulated films may be disposed between the common electrode and the first pixel electrode and between the common electrode and the second pixel electrode.

In this case, when the difference between potentials provided to the first pixel electrode and to the common electrode is largest or smallest, the potential provided to the second pixel electrode desirably substantially equals the potential provided to the first pixel electrode.

Furthermore, desirably, the plural pieces of the first pixel electrode arranged in each pixel are connected together via a first junction, the plural pieces of the second pixel electrode arranged in each pixel are connected together via a second junction, the plural pieces of the first pixel electrode and the first junction do not overlap the plural pieces of the second pixel electrode and the second junction, the first pixel electrode, the second pixel electrode, the first signal line, and the second signal line are arranged in the same layer, and the common electrode and scan line are arranged in the same layer.

[4] A liquid crystal display apparatus in which the first and second pixel electrodes are disposed on the first substrate, and the common electrodes are disposed on the second substrate.

Desirably, in each pixel, the first and second pixel electrodes may be linear and may be arranged substantially in parallel, and the common electrode overlaps the first and second pixel electrodes.

Further, a dielectric of 1.5 μm thickness may be arranged on the common electrode, and a portion of the dielectric which overlaps the common electrode includes a recess penetrating the dielectric or having a depth amounting to 50% or more of the thickness.

In this case, when the difference between the potentials provided to the first pixel electrode and to the common electrode is largest or smallest, the potential provided to the common electrode is desirably substantially equal to the average of the potentials provided to the first pixel electrode and to the second pixel electrode.

[5] Desirably, the liquid crystal apparatus includes a scan driver, a plurality of first scan lines connected to the scan driver, a plurality of first signal lines connected to the first signal driver and disposed so as to cross the plurality of first scan lines, and second signal lines connected to the second signal driver, the plurality of pixels each correspond to an area enclosed by a corresponding one of the plurality of first scan lines and a corresponding one of the plurality of first signal lines, the first pixel electrodes correspond to the first signal lines, and the second pixel electrodes corresponds to the second signal lines.

Desirably, the first substrate is provided with the first scan lines, the first signal lines, and first switch elements each arranged in a neighborhood of an intersection between the corresponding first scan line and first signal line, and the second substrate is provided with second scan lines connected to the scan driver and arranged so as to cross the second signal lines, the second signal lines, and second switch elements each arranged in a neighborhood of an intersection between the corresponding second scan line and second signal line.

Alternatively, the first substrate is provided with the first scan lines, the first signal lines, the second signal lines, first switch elements each arranged in a neighborhood of an intersection between the corresponding first scan line and first signal line, and second switch elements each arranged in a neighborhood of an intersection between the corresponding first scan lines and second signal line.

DETAILED DESCRIPTION OF THE EMBODIMENTS

Figure 1:
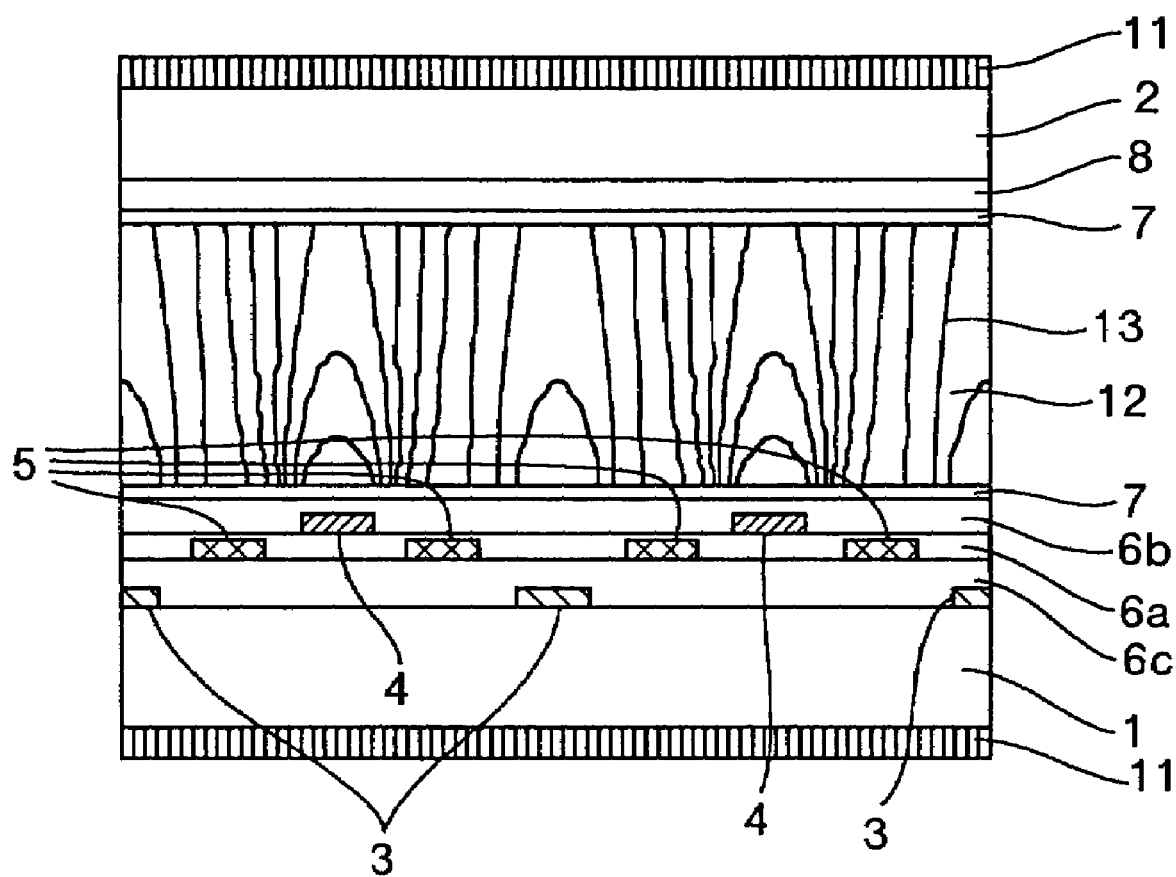
FIG. 1 is a view showing a sectional configuration of a pixel according to Embodiment 1 of a liquid crystal display apparatus of the present invention.

The causes of the variation in the color tones in the IPS display mode will be described below.

The transmissivity (T) in the IPS display mode is expressed by Equation [1]:

$$T = T_0 \cdot \sin^2(2\phi) \cdot \sin^2((\pi \cdot d_{eff} \cdot \Delta n_{eff})/\lambda) \quad [1]$$

where $T_0$ denotes a correction factor, $\phi$ denotes the angle between an effective optical axis of a liquid crystal and a polarization direction of incident light, and $\lambda$ denotes the wavelength of the incident light.

Accordingly, when the angle between the effective orientation direction of the liquid crystal and the polarization direction of the incident light is $\pi/4$ radian (45°), light of the wavelength $\lambda$, which is double the effective retardation $d_{eff} \cdot \Delta n_{eff}$, exhibits the highest transmissivity. That is, the variation in the effective retardation $d_{eff} \cdot \Delta n_{eff}$ varies the wavelength having the highest transmissivity, thereby varying the color tones.

Thus, the reason why the color tones, which have been bluish, become yellowish as the driving voltage increases is shown below. With a low driving voltage, the effective thickness $d_{eff}$ is small due to the movement of part of the liquid crystal layer. With a high driving voltage, the effective thickness $d_{eff}$ is large due to the movement of the entire liquid crystal layer.

The problems with the variations in color tones can be solved as described below.

Equation [1] indicates that the wavelength $\lambda$ having the highest transmissivity is double the wavelength of the effective retardation $d_{eff} \cdot \Delta n_{eff}$. Accordingly, by adjusting the $\Delta n_{eff}$ so as to offset the variation in the effective thickness $d_{eff}$ depending on the driving voltage, the variation in effective retardation $d_{eff} \cdot \Delta n_{eff}$ as well as the variation in the wavelength $\lambda$ having the highest transmissivity can be restrained.

The effective refractive-index anisotropy $\Delta n_{eff}$ can be adjusted in the following manner: When all the liquid crystals rise at a rising angle $\phi$ from the substrate 1, the effective refractive-index anisotropy $\Delta n_{eff} = \cos\theta \cdot \Delta n$, where $\Delta n$ denotes the refractive-index anisotropy of the liquid crystal. Accordingly, the effective refractive-index anisotropy $\Delta n_{eff}$ can be adjusted by regulating the start-up of the liquid crystals. In the above described conventional IPS display mode, since the liquid crystals are moved by the horizontal fields, the liquid crystals will not rise, and the refractive-index anisotropy $\Delta n_{eff}$ of the liquid crystals substantially equals the refractive-index anisotropy $\Delta n$ thereof. When, however, electric fields having vertical field components are applied to the liquid crystals, the latter, having a positive dielectric anisotropy, rise to reduce the effective refractive-index anisotropy $\Delta n_{eff}$ of the liquid crystals.

When the liquid crystals rise to reduce the effective refractive-index anisotropy $\Delta n_{eff}$, the transmissivity of blue light, having a short wavelength, increases as shown by Equation [1].

In the conventional IPS display mode, the color tones become yellowish as the driving voltage increase. This problem can be solved by the present invention in the following manner: With a low driving voltage, no vertical field components are applied, thus preventing the liquid crystals from rising. At this time, a backlight or the gap is regulated so as to obtain a desired white. With a high driving voltage, vertical field components are applied to raise the liquid crystals, thereby reducing the effective refractive-index anisotropy $\Delta n_{eff}$. At this time, the blue, having a short wavelength, is emphasized to prevent the color tones from becoming yellowish. In this manner, the variation in the color tones depending on the driving voltage can be restrained.

As described above, if the color tones become yellowish as the driving voltage increases, the liquid crystals may be prevented from rising when the driving voltage is lowest, and may be raised when it is highest. On contrary, if the color tones become bluish as the driving voltage increases, the liquid crystals may be raised when the driving voltage is lowest, and may be prevented from rising when it is highest. On the other hand, if, instead of varying monotonously, the color tones become bluish and yellowish as the driving voltage varies, the liquid crystals may be prevented from rising when the color tones become bluest, and may be raised when they become yellowest.

According to the present invention, the liquid crystal panel alone can restrain the variation in the color tones depending on the driving voltage, with no particular restrictions on the light source. Further, the variation in the color tones depending on the driving voltage can be restrained without any restrictions on the retardation. Consequently, the refractive index or anisotropy of the liquid crystals is not restricted, and those crystals are available which have a high refractive-index anisotropy but are quick to respond and which have a wide range of operative temperatures.

It has been reported that when the face color of people in an image become bluish, viewers get the impression that the image is more degraded (Video Information Media Society Magazine, Vol. 54, No. 1, p. 93 to 100 (2,000)). Thus, in an animated image with a large number of people displayed, the face color can be restrained from becoming bluish by restraining the liquid crystals from rising, while making the display yellowish. That is, natural animated images can be displayed. On the contrary, for a display for a word processor program or the like, images can be clearly displayed by raising the liquid crystals and making the display bluish.

Equation [1] represents a transmissivity obtained in a normally black mode in which the apparatus enters a dark state when the driving voltage is low. The present invention, however, restrains the variation in the color tones by adjusting the retardation, and is thus applicable even to a normally white mode in which the apparatus enters a bright state when the driving voltage is low.

JP-A-9-244046 specification reports means for forming vertical field components to modulate the color tones. The means reported in this forms vertical field components on the basis of the difference between the average potential pair of comb teeth electrodes disposed on one of the substrates, and the potential at an opposite electrode disposed on the other substrate substantially halfway between the comb teeth electrode. In a manufacturing process, however, the upper and lower substrates may be misaligned, and the resulting locational relationship between the pair of comb teeth electrodes and the opposite electrode may not be as designed. In this case, the distribution of electric fields applied to the liquid crystals significantly differs from the design. Thus, to obtain desired chromaticity and brightness, the relationship between the potential at the comb teeth electrodes and the potential at the opposite electrode must be adjusted for each liquid crystal display apparatus.

The present invention is adapted to solve the above problems, and it is an object thereof to provide a configuration that prevents the distribution of electric fields applied to the liquid crystals even if the upper and lower substrates are misaligned as well as a new method for controlling vertical and horizontal field components.

Next, the present invention will be more specifically described on the basis of embodiments.

Embodiment 1

Figure 3:
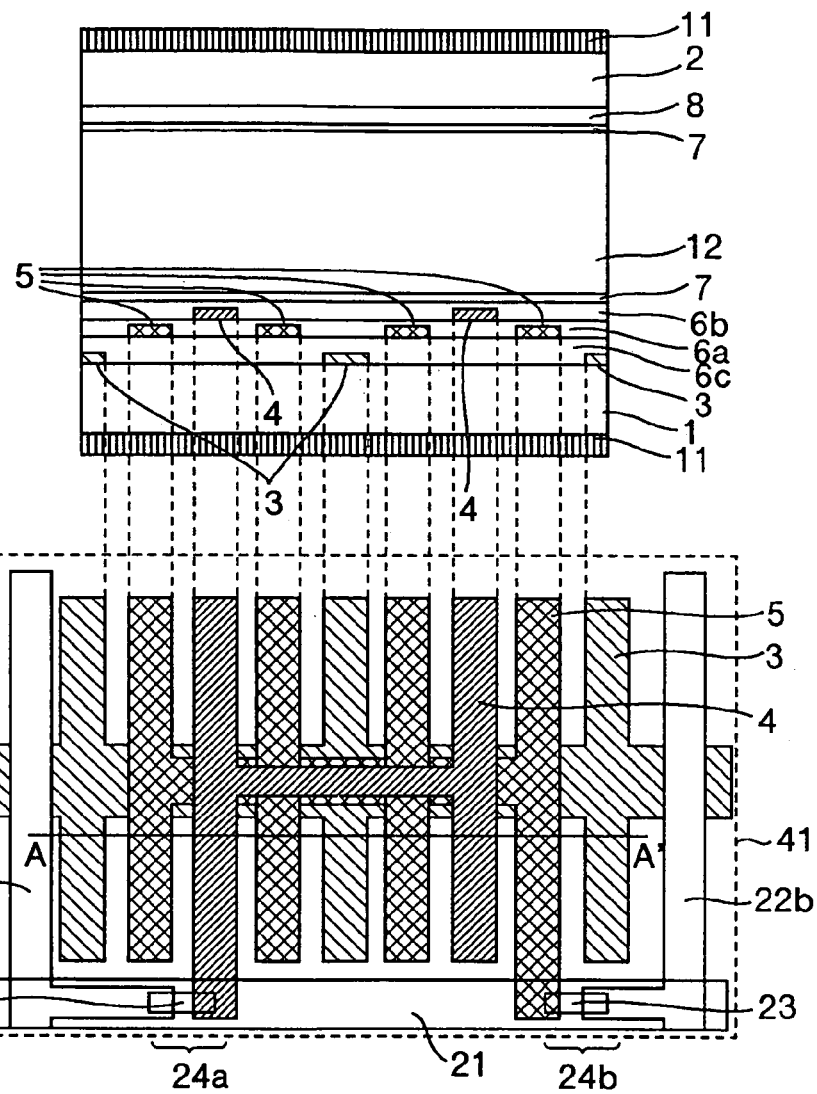
FIGS. 3A and 3B are views showing a configuration of the pixel according to Embodiment 1 of the liquid crystal display apparatus of the present invention.
Figure 4:
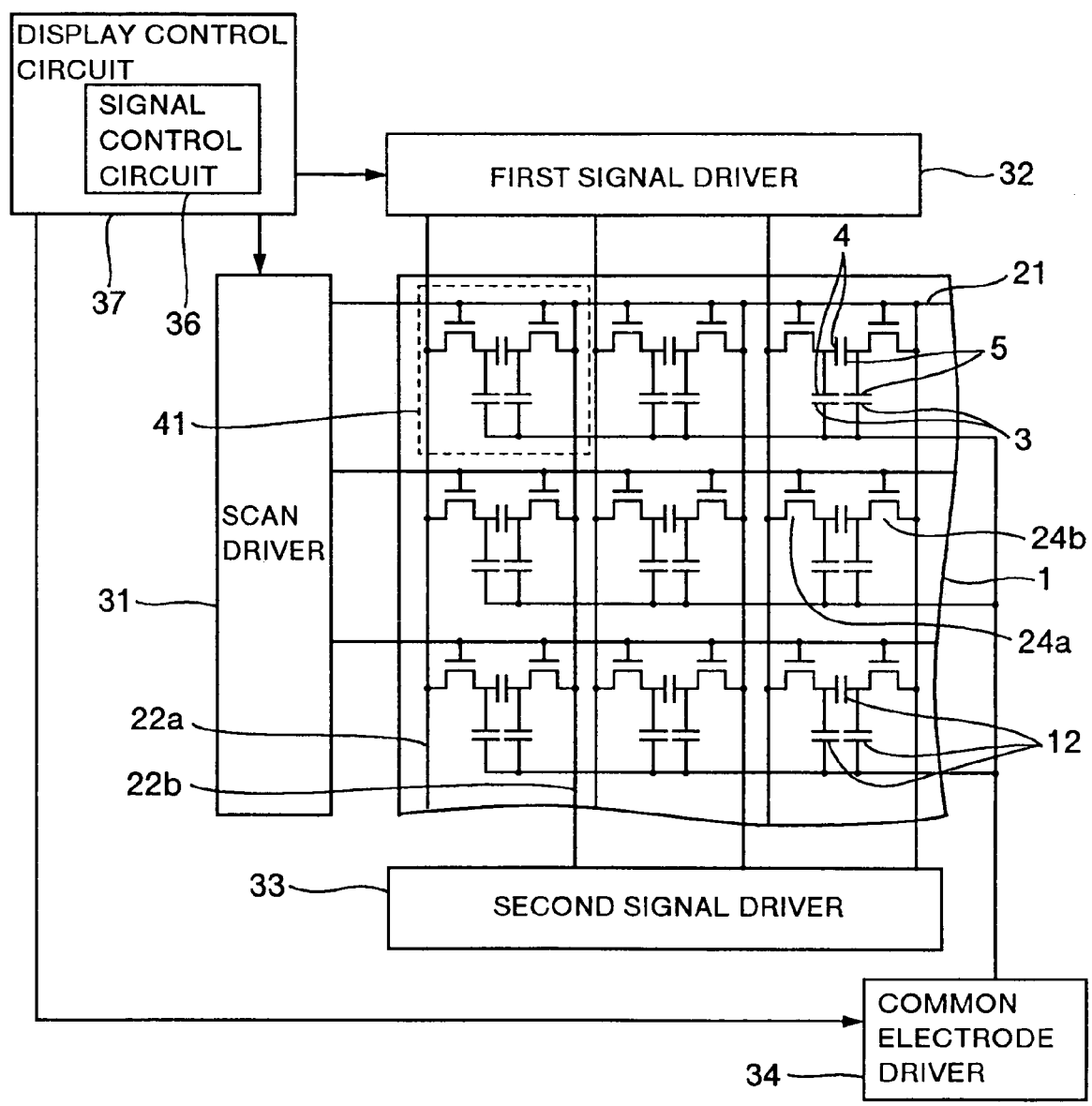
FIG. 4 is a diagram showing a configuration of Embodiment 1 of the liquid crystal display apparatus of the present invention.

The configuration of Embodiment 1 of the present invention will be described with reference to FIGS. 3A, 3B, and 4. FIGS. 3A and 3B are views useful in explaining the configuration of a pixel portion, and FIG. 4 is a view useful in explaining a driving system for a liquid crystal display apparatus. More specifically, FIG. 3B is a bird's eye view useful in explaining the configuration of a pixel 41 on a substrate 1, FIG. 3A is a sectional view taken along line A–A' in FIG. 3B, and FIG. 4 is a view useful in explaining a configuration for wiring on the substrate 1.

A liquid crystal display apparatus of this embodiment has a configuration described below.

As shown in FIGS. 3A and 3B, the apparatus has a substrate 1, a substrate 2, a liquid crystal layer 12 sandwiched between the substrates 1 and 2 and having a positive dielectric anisotropy, a plurality of pixels 41 forming a display section, a first pixel electrode 4 and a second pixel electrode 5 corresponding to the pixel 41, and a common electrode 3 corresponding to the first pixel electrode 4 and the second pixel electrode 5.

Further, as shown in FIG. 4, the apparatus comprises a first signal driver 32 for supplying a potential to the first pixel electrodes 4, a second signal driver 33 for supplying a potential to the second pixel electrodes 5, a signal control circuit 36 for controlling signals transmitted to the first signal driver 32 and the second signal driver 33, a common electrode driver 34 for supplying a potential to the common electrode 3, a scan driver 31 for selecting pixels, a signal control circuit 36, and a display control circuit 37 for controlling the first and second signal drivers 32 and 33, the common electrode driver 34, and the scan driver 31. The substrate 1 comprises a plurality of scan lines 21 connected to the scan driver 31, a plurality of first signal lines 22a connected to the first signal driver 32, crossing the scan lines 21, and corresponding to the first pixel electrodes 4, a plurality of second signal lines 22b connected to the second signal driver 33, crossing the scan lines 21, and corresponding to the second pixel electrodes 5, pixels 41 each formed so as to correspond to an area enclosed by the corresponding scan line 21 and first signal line 22a, first TFTs 24a that are each a switch element arranged near the intersection between the corresponding scan line 21 and first signal line 22a and electrically connected to these scan line 21 and second signal line 22a, second TFTs 24b that are each a switch element arranged near the intersection between the corresponding scan line 21 and first signal line 22b and electrically connected to these scan line 21 and second signal line 22b, the first pixel electrodes 4 each electrically connected to the first TFT 24a, second pixel electrodes 5 each electrically connected to the second TFT 24b, and common electrodes 3 each electrically connected to the common electrode driver 34.

Further, as shown in FIGS. 3A and 3B, the substrate 1 has the common electrode 3, the first pixel electrode 4, the second pixel electrode 5, and an insulated film 6 disposed thereon. The insulated film 6 has an alignment layer 7 disposed thereon. The substrate 2 has a color filter 8 and an alignment layer 7 disposed thereon. Surfaces of the substrates 1 and 2 which do not face the liquid crystal each have a polarizer 11 disposed thereon. Here, the order in which the electrodes and the insulated film are arranged is not limited in order to obtain the effects of the present invention.

The first pixel electrode 4, the common electrode 3, and the second pixel electrode 5 disposed on the substrate 1 are linear, each have a width of 4 µm, and are arranged substantially in parallel. The material of these electrodes is chromium molybdenum. The second pixel electrode 5 is located between the common electrode 3 and the first pixel electrode 4, and the material thereof is ITO (Indium-Tin-Oxide). The distance between the first pixel electrode 4 and the second pixel electrode 5 is 10 µm. Then, the material or width of these electrodes is not particularly limited in order to obtain the effects of the present invention. However, for an increased aperture ratio, the second pixel electrode is desirably a transparent conductor such as ITO.

In this embodiment, since all the electrodes are thus disposed on the substrate 1, the distribution of electric fields does not vary even if the substrates 1 and 2 are misaligned. Thus, the potentials provided to the electrodes need not be adjusted for each liquid crystal display apparatus as in the above described JP-A-9-244046 specification.

The substrates 1 and 2 are made of glass of 0.7 mm thickness. The first TFT 24a and the second TFT 24b are each made of amorphous silicon 23. In the present invention, the two switch elements are thus disposed, so that arbitrary potentials can be provided to two of the three electrodes to form an arbitrary distribution of electric fields. As a result, movements such as the twisting or rising of liquid crystals can be controlled.

The first pixel electrode 4 and the common electrode 3 are each made of chromium molybdenum. Insulated films 6a, 6b, and 6c are each composed of silicon nitride, and have a film thickness of 0.2, 0.8, and 0.8 μm, respectively. The alignment layer 7 has a film thickness of 80 nm, and is subjected to a rubbing process for orienting a liquid crystal. A rubbing direction is inclined through 15° from the longitudinal direction of the first pixel electrode 4.

Polymeric beads of 4 μm diameter are distributed between the substrates 1 and 2 to maintain a constant gap in a liquid crystal layer. The liquid crystal layer has a refractive-index anisotropy of 0.0947 and a dielectric anisotropy of 10.5.

The polarizers 11 are arranged in a crossed Nicols manner so as to establish the normally black mode. A transmission axis of one of the polarizers aligns with the rubbing direction.

A back light is not restricted, and an under light type or a side light type may be used; a back light having color tones that provide a desired white is employed in the present invention.

Active matrix driving is used in this embodiment.

Figure 2:
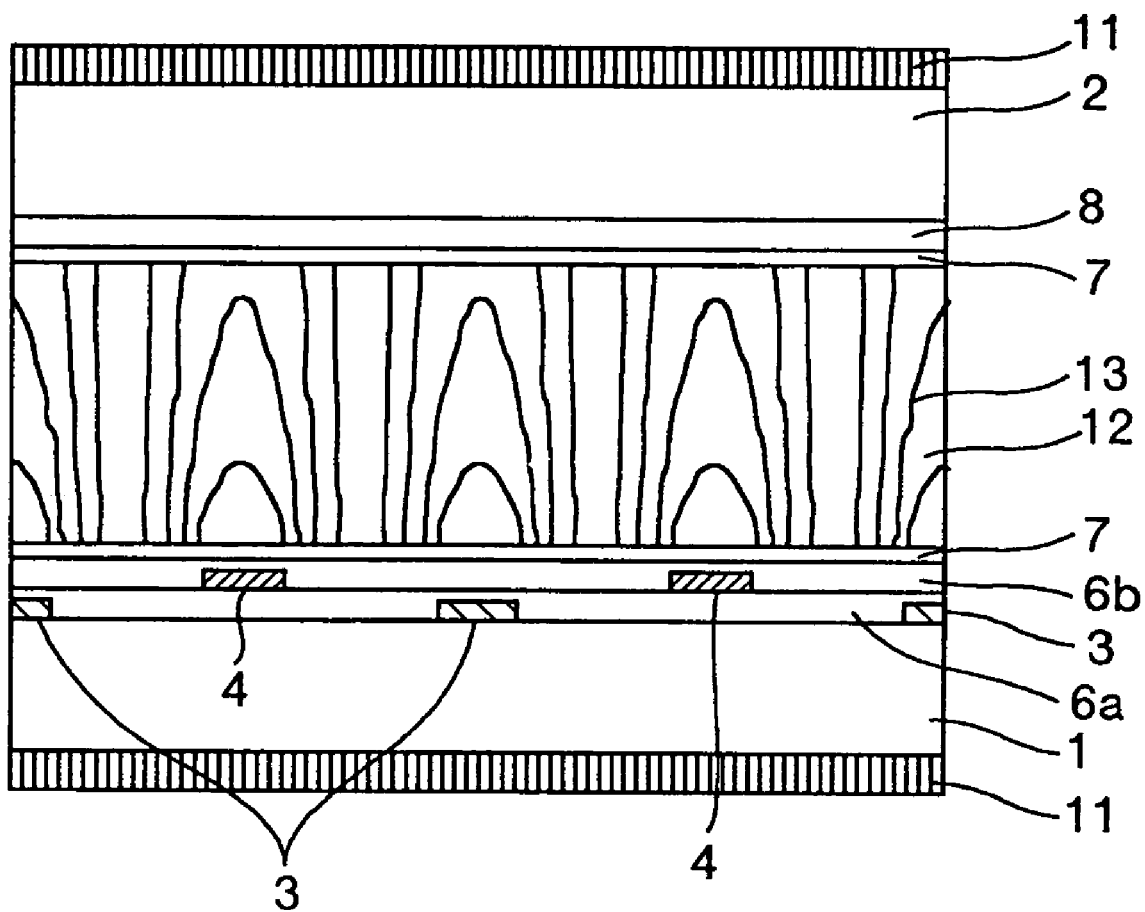
FIG. 2 is a view showing a sectional configuration of a pixel according to a conventional liquid crystal display apparatus.

The distribution of electric fields according to this embodiment will be described with reference to FIG. 1. FIG. 1 corresponds to FIG. 3A, to which equipotential lines have been added. As is apparent from equipotential lines 13, the distribution of electric fields applied to the liquid crystal according to this embodiment is different from that obtained in the conventional IPS display mode as shown in FIG. 2. Further, in the IPS display mode, since only two electrodes are provided, the distribution of electric fields cannot be arbitrarily controlled. According to the present invention, however, since the two electrodes and the two switch elements are provided, the distribution of electric fields can be controlled.

Figure 5A:
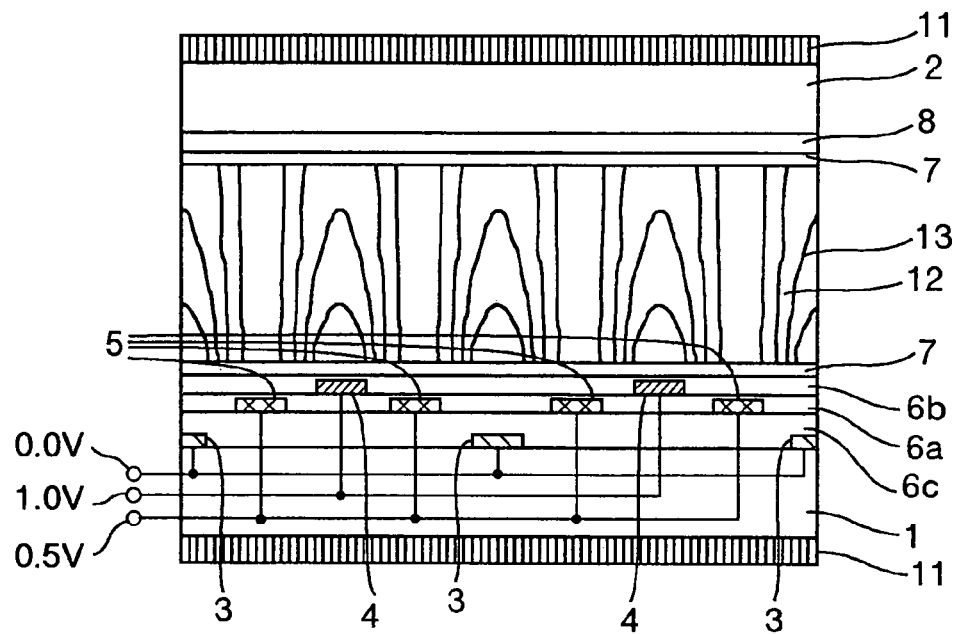
FIGS. 5A and 5B are views useful in explaining control of a distribution of electric fields in the pixel portion according to Embodiment 1 of the liquid crystal display apparatus of the present invention.
Figure 5B:
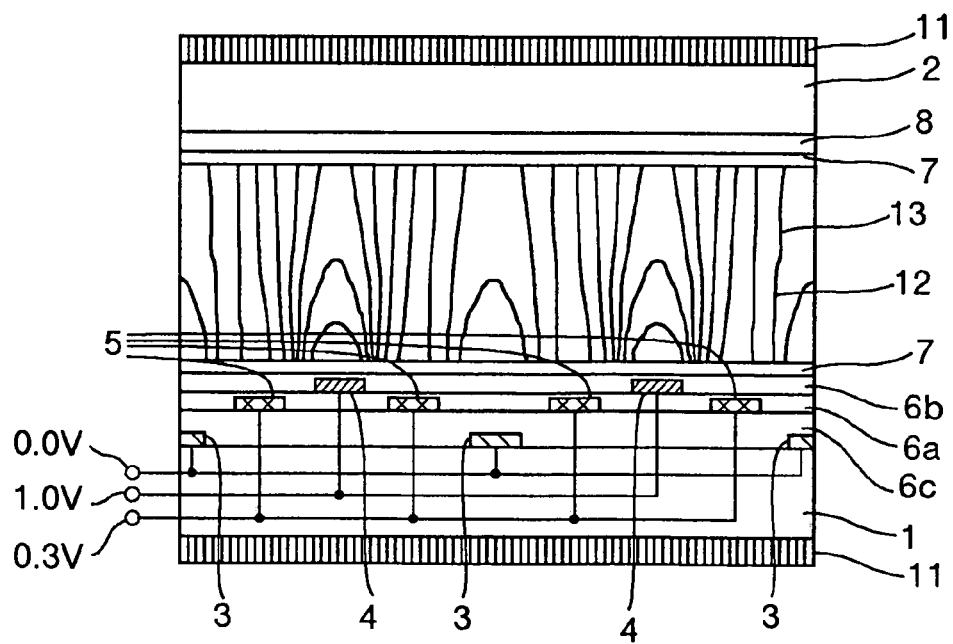

The distribution of electric fields can be controlled by adjusting the ratio of the potentials provided to the common electrode 3, the first pixel electrode 4, and the second pixel electrode 5. Distributions of electric fields obtained by adjusting the ratio of the potentials provided to the common electrode 3, the first pixel electrode 4, and the second pixel electrode 5 will be described with reference to FIG. 5. FIG. 5A shows a distribution of electric fields obtained when potentials are provided to the common electrode 3, the first pixel electrode 4, and the second pixel electrode 5 at a ratio of 0.0:1.0:0.5. Likewise, FIG. 5B shows a distribution of electric fields obtained when potentials are provided to the common electrode 3, the first pixel electrode 4, and the second pixel electrode 5 at a ratio of 0.0:1.0:0.3. In this case, the rate of vertical field components is higher in FIG. 5B than in FIG. 5A. That is, in FIG. 5B, the liquid crystals rise more sharply than in FIG. 5A, thus emphasizing the blue. The distribution of electric fields can be adjusted in this manner.

As described above, in this embodiment, the vertical and horizontal field components are regulated by providing a potential to the second pixel electrode 5 so as to disturb electric fields formed by the first pixel electrode 4 and the common electrode 3.

The ratio of the potentials provided to the common electrode 3, the first pixel electrode 4, and the second pixel electrode 5 is determined in the following manner: The driving voltage, that is, a potential difference between the common electrode 3 and the first pixel electrode 4, is varied while keeping the potential provided to the second pixel electrode 5 equal to the average of the potentials provided to the common electrode 3 and the first pixel electrode 4. Then, a driving voltage with which the image becomes most bluish is determined. At this time, the refractive-index anisotropy of the liquid crystal and the gap in the liquid crystal layer are regulated so as to obtain a desired white. Then, while varying the driving voltage, the potential provided to the second pixel electrode is adjusted by the signal control circuit 36 so as to obtain the desired white. In this manner, the desired white is obtained in all gradations.

In this case, the distribution of electric fields depends on the sequence of the electrode layers, the shapes and sizes of the electrodes, the thicknesses and material of the insulated films, the material of the liquid crystal, the gap of the liquid crystal layers, the substrates, or the like. However, by correspondingly adjusting the ratio of the potentials provided to the common electrode 3, the first pixel electrode 4, and the second pixel electrode 5, the effects of the present invention can be obtained. Furthermore, the effects of the present invention can of course be obtained even if the refractive index of the liquid crystal layer, the gap in the liquid crystal layer, the back light, or the like is different from that of this embodiment.

In this embodiment, since all the electrodes are disposed on the substrate 1, the variation of the distribution of electric fields is very small even if the substrates 1 and 2 are misaligned. Consequently, this embodiment is unlikely to be affected by misalignment.

Figure 6:
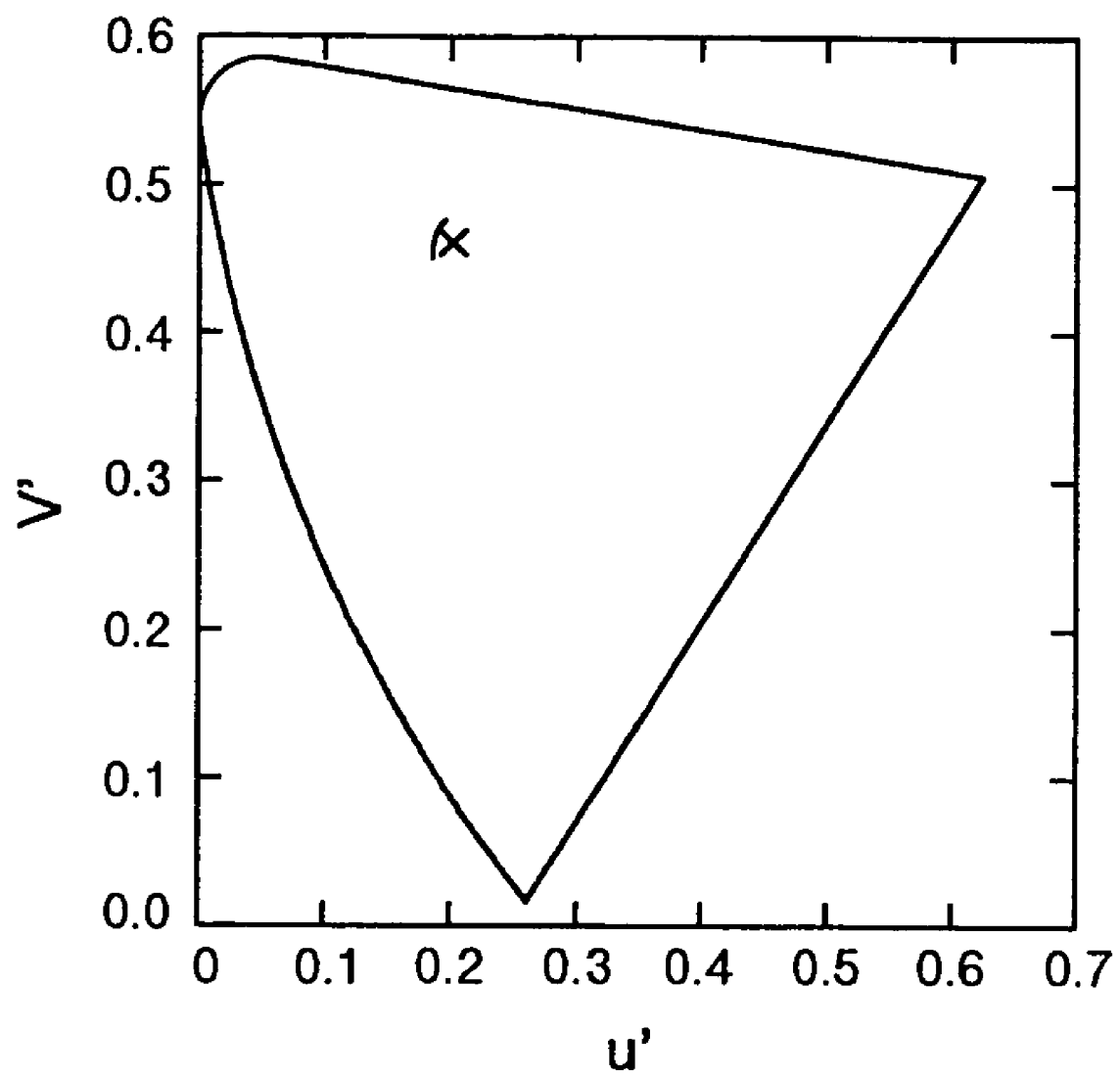
FIG. 6 is a chart showing a dependence of color tones on a driving voltage according to Embodiment 1 of the liquid crystal display apparatus of the present invention.

In this embodiment, the chromaticity can be controlled by adjusting the ratio of the potentials provided to the common electrode 3, the first pixel electrode 4, and the second pixel electrode 5 so as to change the manner of raising the liquid crystal. As a result, the dependence of color tones on the gradation is as shown in the chromaticity chart (CIE: Comission International de l'eclairage (1976) in FIG. 6. The symbol x in this figure denotes the chromaticity of "white". The amount of variation is below the detection limits of human beings; this embodiment provides a liquid crystal display apparatus in which the dependence of the color tones on the gradation is very low.

COMPARATIVE EXAMPLE

Figure 7:
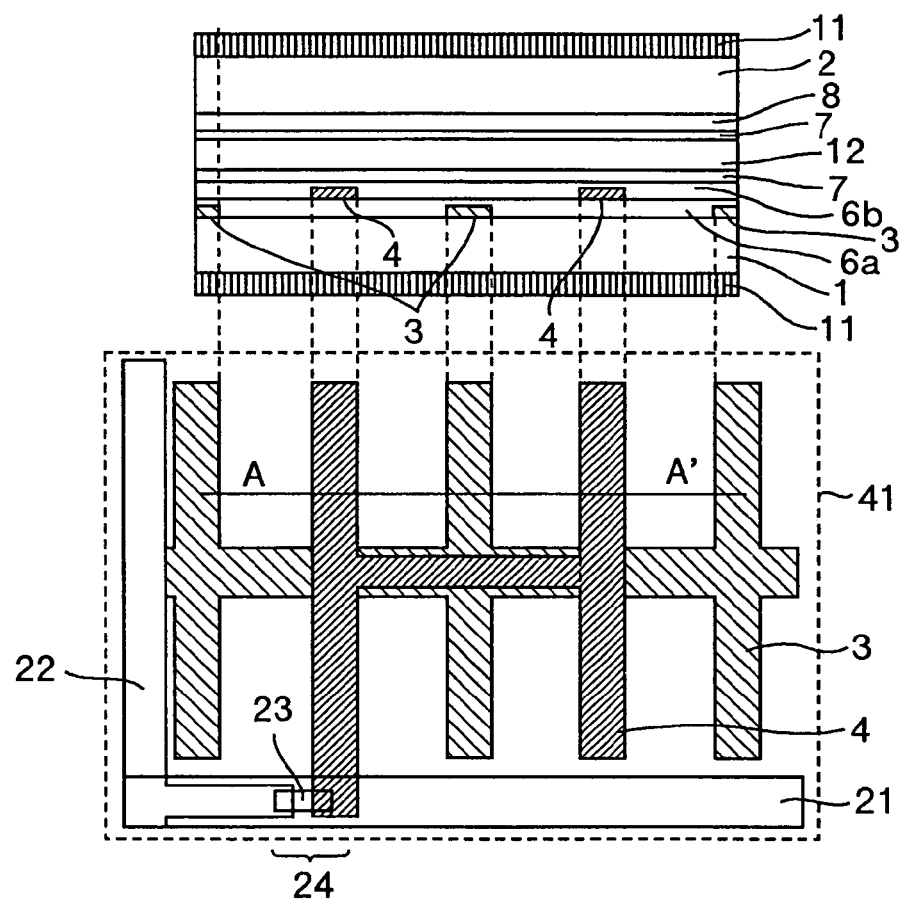
FIGS. 7A and 7B are views showing a configuration of the pixel according to the conventional liquid crystal display apparatus.
Figure 8:
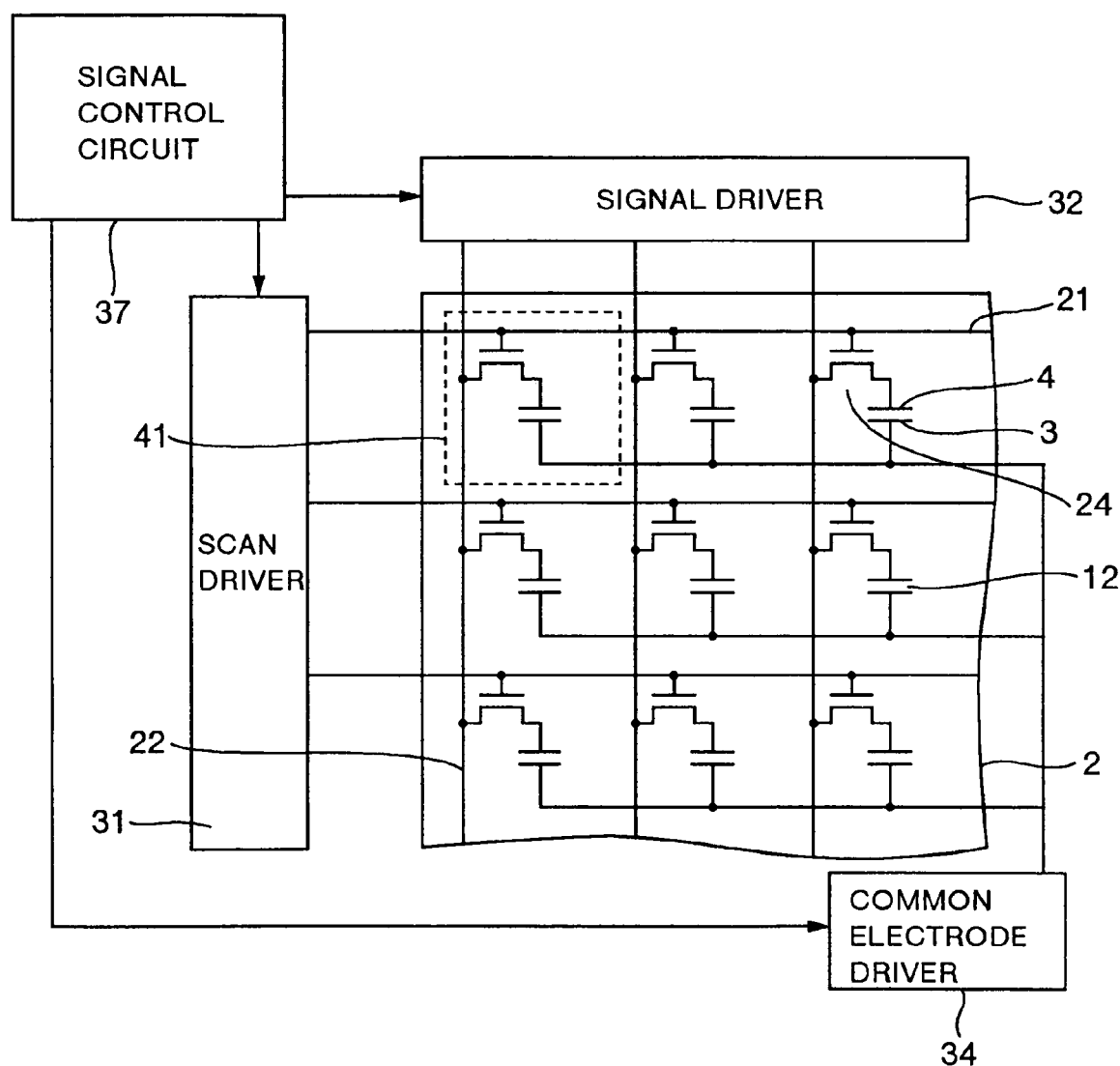
FIG. 8 is a diagram showing a configuration of the conventional liquid crystal display apparatus.

The configuration of a comparative example of the present invention will be described with reference to FIGS. 7A, 7B and 8. FIGS. 7A and 7B are views useful in explaining the configuration of a pixel portion, and FIG. 8 is a view useful in explaining a driving system for a liquid crystal display apparatus. More specifically, FIG. 7B is a bird's eye view useful in explaining the configuration of the pixel 41 on the substrate 1, FIG. 7A is a sectional view taken along line A–A' in FIG. 7B, and FIG. 8 is a view useful in explaining a configuration for wiring on the substrate 1.

A liquid crystal display apparatus of this embodiment has a configuration described below.

As shown in FIGS. 7A and 7B, the apparatus has the substrate 1, the substrate 2, the liquid crystal layer 12 sandwiched between the substrates 1 and 2 and having a positive dielectric anisotropy, the plurality of pixels 41 forming the display section, the first pixel electrode 4 corresponding to the pixel 41, and the common electrode 3 corresponding to the pixel electrode 4.

Further, as shown in FIG. 8, the apparatus comprises the signal driver 32 for supplying a potential to the pixel electrodes 4, the common electrode driver 34 for supplying a potential to the common electrodes 3, the scan driver 31 for selecting pixels, and the display controller 37 for controlling the signal drivers 32, the common electrode driver 34, and the scan driver 31. The substrate 1 comprises the plurality of scan lines 21 connected to the scan driver 31, the plurality of signal lines 22 connected to the signal driver 32, crossing the scan lines 21, and corresponding to the pixel electrodes 4, the pixels 41 each formed so as to correspond to the area enclosed by the corresponding scan line 21 and signal line 22, the TFTs 24 that are each a switch element arranged near the intersection between the corresponding scan line 21 and signal line 22 and electrically connected to these scan line 21 and signal line 22, the pixel electrodes 4 each electrically connected to the TFT 24, and the common electrodes 3 each electrically connected to the common electrode driver 34.

Further, as shown in FIGS. 7A and 7B, the substrate 1 has the common electrode 3 and the pixel electrode 4 disposed thereon. The insulated film 6 has the alignment layer 7 disposed thereon. The substrate 2 has the color filter 8 and the alignment layer 7 disposed thereon. The surfaces of the substrates 1 and 2 which do not face the liquid crystal each have the polarizer 11 disposed thereon.

The pixel electrode 4 and the common electrode 3, both disposed on the substrate 1, are linear, each have a width of 4 μm, and are arranged substantially in parallel. The distance between the pixel electrode 4 and the common electrode 3 is 10 μm.

The substrates 1 and 2 are made of glass of 0.7 mm thickness. The TFT 24 is made of the amorphous silicon 23. The pixel electrode 4 and the common electrode 3 are each made of chromium molybdenum. The insulated films 6a and 6b are each composed of silicon nitride, and have a film thickness of 0.2 and 0.8 μm, respectively. The alignment layer 7 has a film thickness of 80 nm, and is subjected to a rubbing process for orienting the liquid crystal. The rubbing direction is inclined through 15° from the longitudinal direction of the first pixel electrode 4.

The polymeric beads of 4 μm diameter are distributed between the substrates 1 and 2 to maintain a constant gap in a liquid crystal layer. The liquid crystal layer has a refractive-index anisotropy of 0.0947 and a dielectric anisotropy of 10.5.

The polarizers 11 are arranged in a crossed Nicols manner so as to establish the normally black mode. The transmission axis of one of the polarizers aligns with the rubbing direction.

The backlight is the same as in Embodiment 1.

The active matrix driving is used in this example.

With respect to the sectional configuration of the pixel portion in this comparative example, a comparison between FIGS. 7A and 3A indicates that the configuration on the substrate 2 in this comparative example is the same as in Embodiment 1 and that the configuration on the substrate 1 therein is also the same as in Embodiment 1 except that the substrate 1 does not have the second pixel electrode 5 nor the insulated film 6c disposed thereon.

Figure 9:
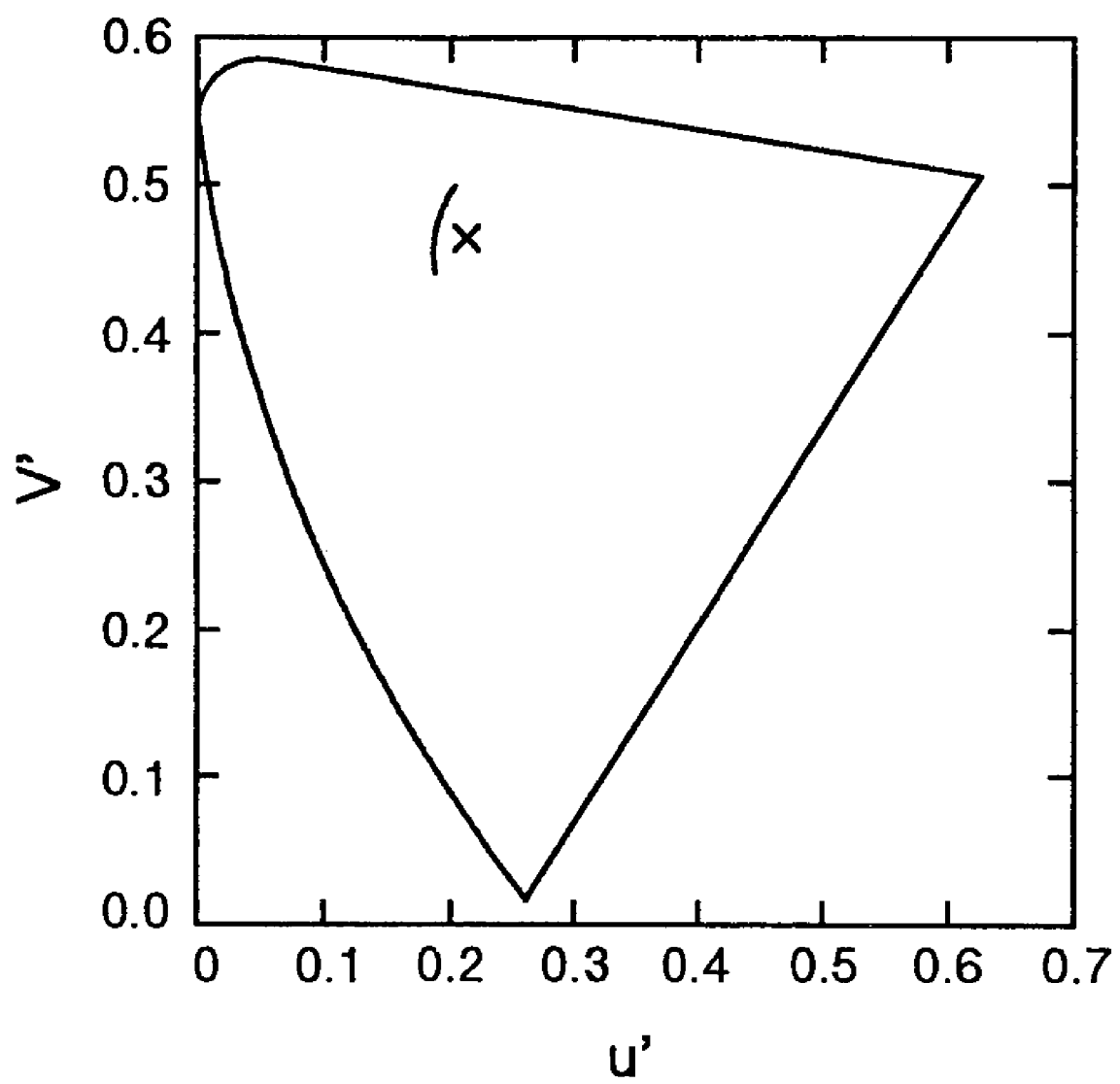
FIG. 9 is a chart showing a dependence of color tones on a driving voltage according to the conventional liquid crystal display apparatus.

Accordingly, in this comparative example, the lack of the second pixel electrode 5 prevents the distribution of electric fields from being adjusted. Further, the chromaticity varies depending on the driving voltage as shown in FIG. 9, and the amount of the variation is beyond the detection limits of human beings. FIG. 9 shows the chromaticity chart (CIE Comission International de l'eclairage (1976). The symbol x in this figure denotes the chromaticity of "white".

Embodiment 2

Embodiment 2 of the liquid crystal display apparatus according to the present invention is the same as the liquid crystal display apparatus of Embodiment 1 except that the common electrode 3, the first pixel electrode 4, and the second pixel electrode 5 are made of ITO, a transparent conductive material.

In Embodiment 2, the ratio of the potentials provided to the common electrode 3, the first pixel electrode 4, and the second pixel electrode 5 is different from that in Embodiment 1. This is because the area through which light is transmitted changes to vary the average of $E_Z/E_X$ in the area through which light is transmitted. This will be described with reference to FIG. 1. As is apparent from the equipotential lines 13 in FIG. 1, the area on the common electrode 3 and the first pixel electrode 4 has a larger $E_Z/E_X$ than the area between the common electrode 3 and the first pixel electrode 4. Thus, if the common electrode 3 and the first pixel electrode 4 are opaque, light is transmitted through only areas having a small $E_Z/E_X$. On the other hand, if the above three electrodes are transparent, light is transmitted through both areas having a small $E_Z/E_X$ and those having a large $E_Z/E_X$. As a result, the use of transparent electrodes increases the average $E_Z/E_X$ of the areas through which light is transmitted, that is, the effective $E_Z/E_X$ thereof, compared to the use of opaque electrodes.

Thus, the ratio of the potentials provided to the common electrode 3, the first pixel electrode 4, and the second pixel electrode 5 differs from that in Embodiment 1, but the variation in the color tone depending on the driving voltage can be restrained as in Embodiment 1 by adjusting the ratio of the potentials in the same manner as in Embodiment 1.

Embodiment 3

Figure 10:
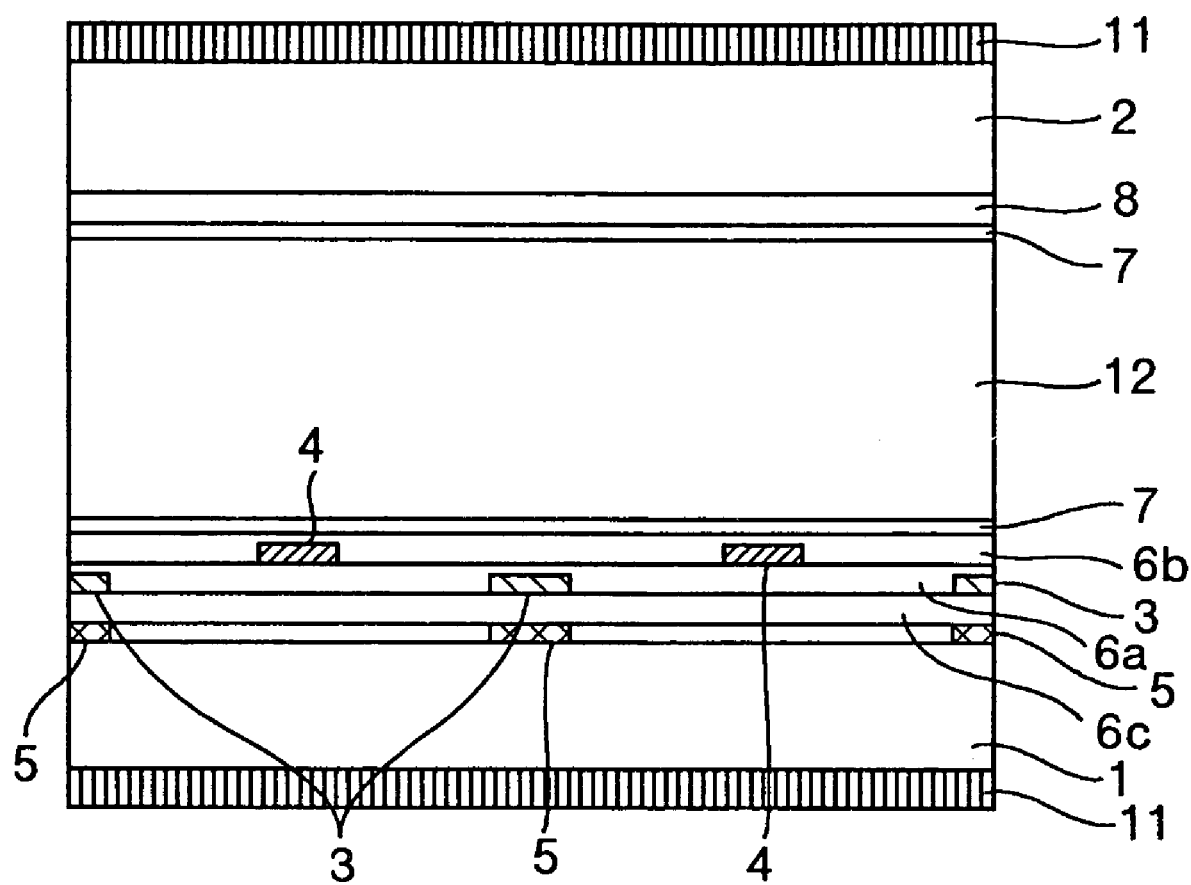
FIG. 10 is a view showing a sectional configuration of a pixel according to Embodiment 3 of the liquid crystal display apparatus of the present invention.

Embodiment 3 of the liquid crystal display apparatus according to the present invention is the same as the liquid crystal display apparatus of Embodiment 1 except that the second pixel electrode 5 overlaps the common electrode 3 and is made of chromium molybdenum like the common electrode 3 and the first pixel electrode 4, as shown in FIG. 10.

In this embodiment, even if the second pixel electrode 5 is not transparent, the aperture ratio does not decrease. Accordingly, the material of the electrodes can be selected more flexibly.

Similar effects are also obtained if the second pixel electrode 5 overlaps the first pixel electrode 4.

Embodiment 4

Figure 11:
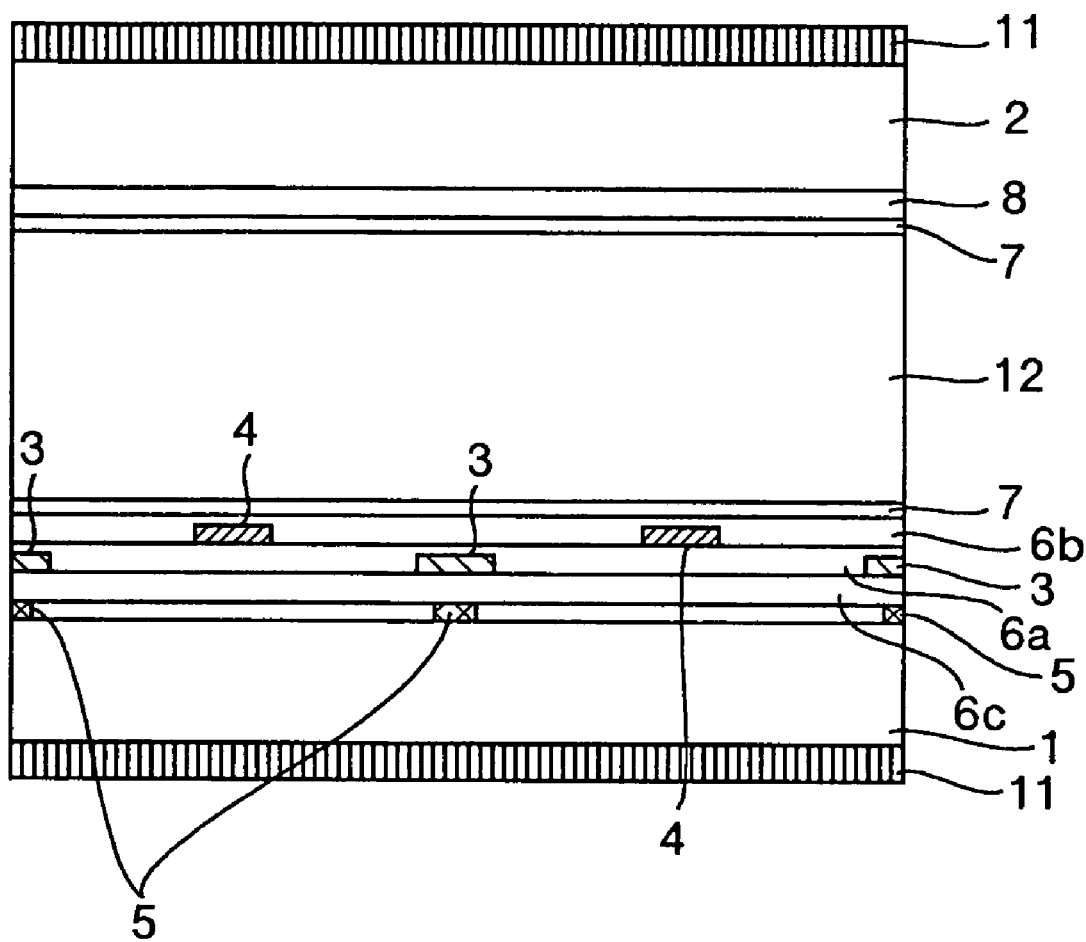
FIG. 11 is a view showing a sectional configuration of a pixel according to Embodiment 4 of the liquid crystal display apparatus of the present invention.

Embodiment 4 of the liquid crystal display apparatus according to the present invention is the same as the liquid crystal display apparatus of Embodiment 3 except that the second pixel electrode 5 is as wide as or narrower than the common electrode 3, overlapped thereby, as shown in FIG. 11.

According to this embodiment, compared to Embodiment 3, the aperture ratio is restrained from decreasing even if the misalignment of a mask during a manufacturing process causes the second pixel electrode 5 and the common electrode 3 to be offset from each other.

Embodiment 5

Figure 12:
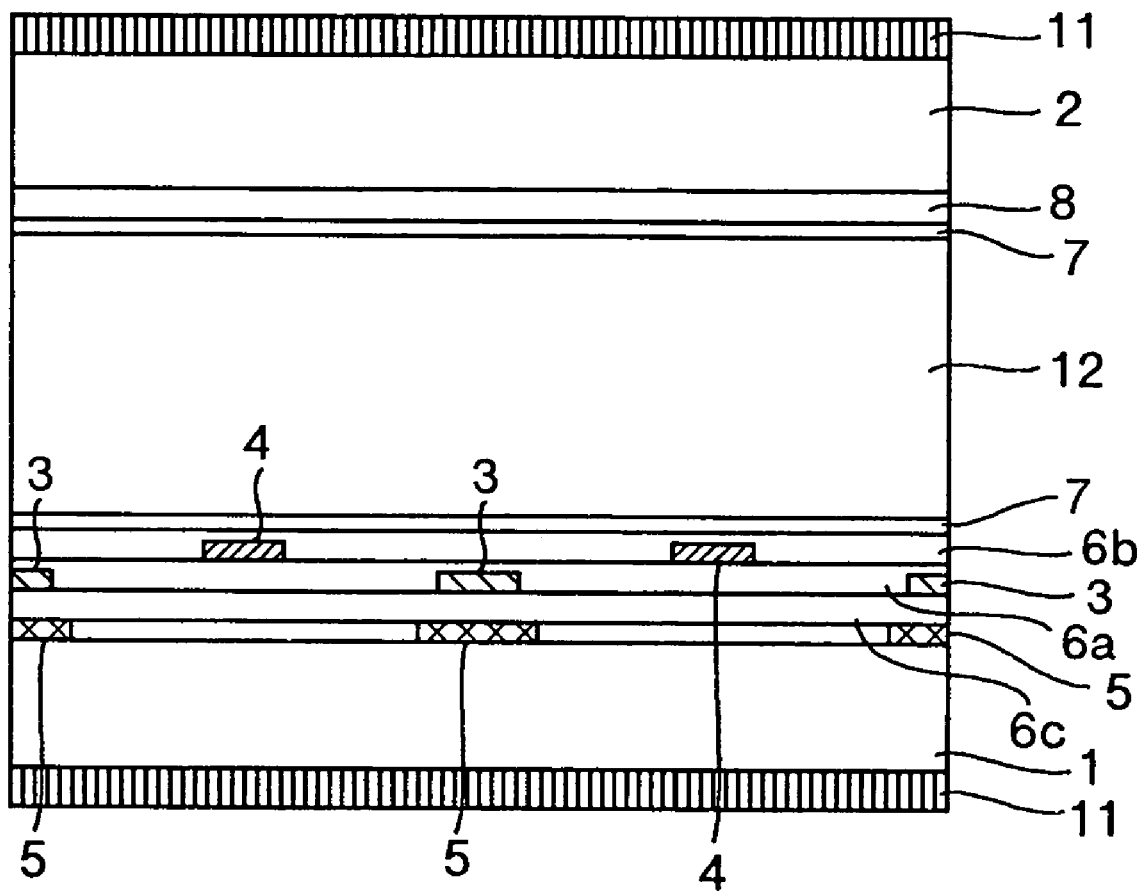
FIG. 12 is a view showing a sectional configuration of a pixel according to Embodiment 5 of the liquid crystal display apparatus of the present invention.

Embodiment 5 of the liquid crystal display apparatus according to the present invention is the same as the liquid crystal display apparatus of Embodiment 3 except that the second pixel electrode 5 is wider than the common electrode 3, overlapped thereby and that the second pixel electrode 5 is composed of ITO, as shown in FIG. 12.

According to this embodiment, compared to Embodiment 3, vertical field components are obtained more easily, thus widening a range over which the color tones can be adjusted.

Embodiment 6

The configuration of Embodiment 6 of the present invention will be described with reference to FIGS. 13A and 13B. FIG. 13B is a bird's eye view useful in explaining the configuration of the pixel 41 on the substrate 1, and FIG. 13A is a sectional view taken along line A–A' in FIG. 13B.

Figure 13A:
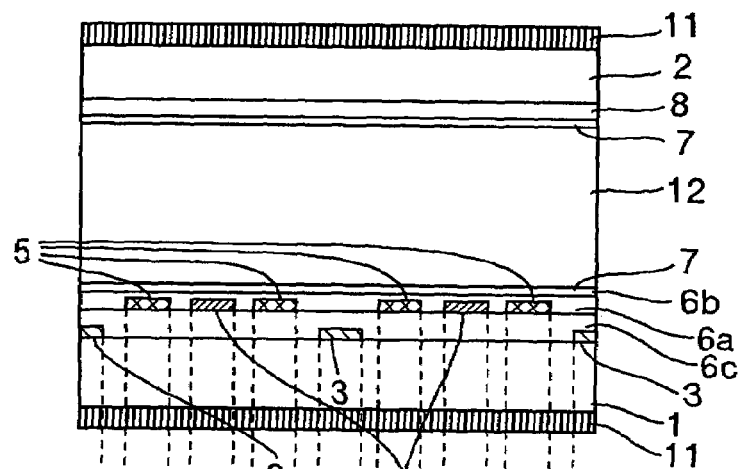
FIGS. 13A and 13B are views showing a sectional configuration of a pixel according to Embodiment 6 of the liquid crystal display apparatus of the present invention.
Figure 13B:
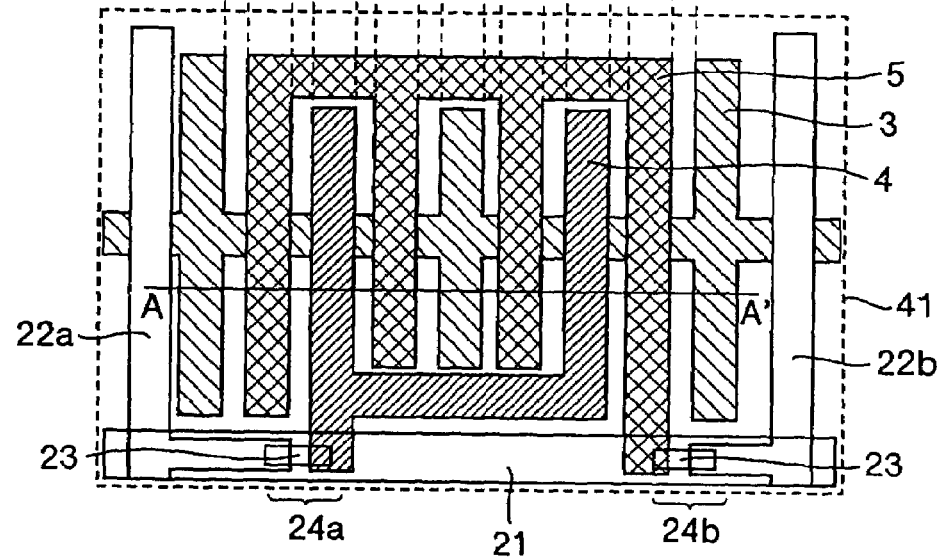

Embodiment 6 of the liquid crystal display apparatus according to the present invention is the same as the liquid crystal display apparatus of Embodiment 1 except for the pixel configuration on the substrate 1, as shown in FIGS. 13A and 13B.

As shown in FIG. 13B, the plurality of first pixel electrodes 4 are connected together via a first junction, the plurality of second pixel electrodes 5 are connected together via a second junction, the plurality of first pixel electrodes 4 and the first junction do not overlap the plurality of second pixel electrodes 5 and the second junction.

As shown in FIG. 13A, the first pixel electrodes 4 and the second pixel electrodes 5 can be arranged in the same layer.

Furthermore, the first pixel electrodes 4, the second pixel electrodes 5, the first signal line 22a, and the second signal line 22b are arranged in the same layer, and the common electrodes 3 and a scanning line 21 are arranged in the same layer.

According to this embodiment, compared to Embodiment 1, the number of insulated layers and thus the number of photolithography steps in the manufacturing process can be reduced.

Embodiment 7

The configuration of Embodiment 7 of the present invention will be described with reference to FIGS. 14A and 14B. FIG. 14B is a bird's eye view useful in explaining the configuration of the pixel 41 on the substrate 1, and FIG. 14A is a sectional view taken along line A–A' in FIG. 14B.

Figure 14A:
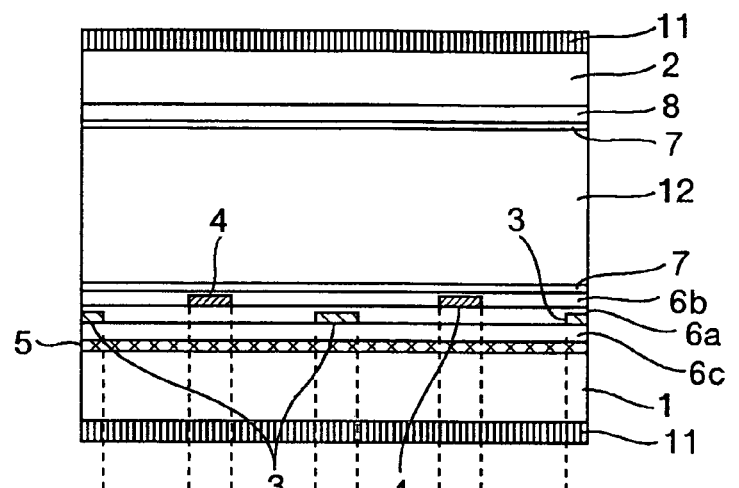
FIGS. 14A and 14B are views showing a sectional configuration of a pixel according to Embodiment 7 of the liquid crystal display apparatus of the present invention.
Figure 14B:
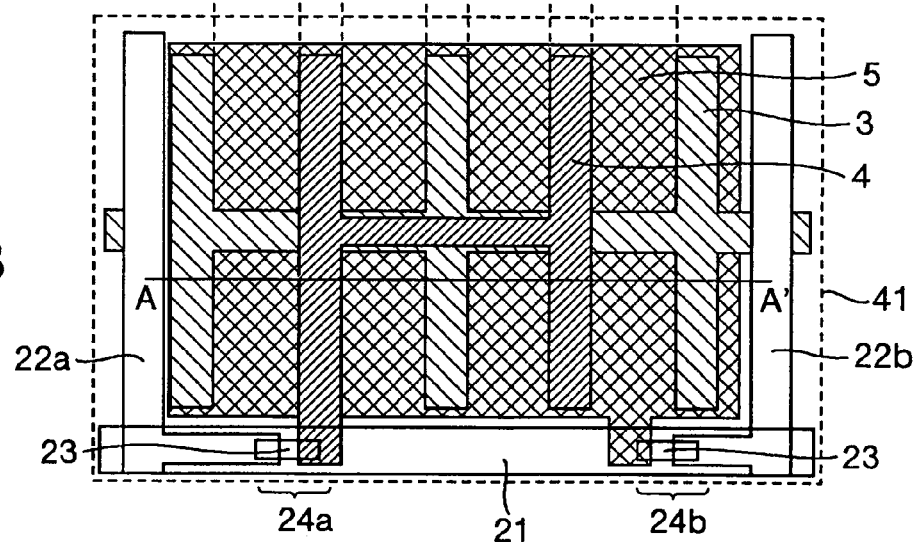

Embodiment 7 of the liquid crystal display apparatus according to the present invention is the same as the liquid crystal display apparatus of Embodiment 1 except that the second pixel electrode 5 is arranged below the first pixel electrode 4 and the common electrode 3 via the insulated film 6c and that the second pixel electrode 5 overlaps the common electrode 3 and the first pixel electrode 4, as shown in FIGS. 14A and 14B.

According to this embodiment, as compared with Embodiment 1, the variation of the distribution of electric fields is small even if the mask is misaligned during the manufacturing process. Consequently, this embodiment is unlikely to be affected by the misalignment of the mask.

It should be appreciated that the present invention is applicable to the case where the common electrode 3, the first pixel electrode 4, and the second pixel electrode 5 are all formed of a transparent conductive material such as ITO.

Embodiment 8

The configuration of Embodiment 8 of the present invention will be described with reference to FIGS. 15A and 15B. FIG. 15B is a bird's eye view useful in explaining the configuration of the pixel 41 on the substrate 1, and FIG. 15A is a sectional view taken along line A–A' in FIG. 15B.

Figure 15A:
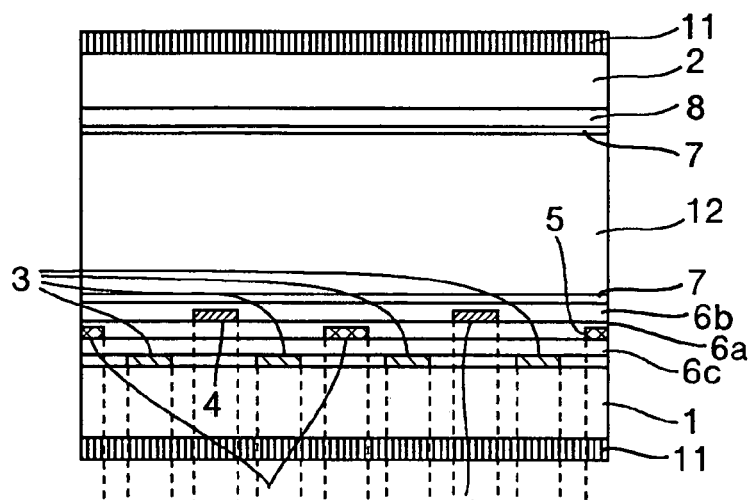
FIGS. 15A and 15B are views showing a sectional configuration of a pixel according to Embodiment 8 of the liquid crystal display apparatus of the present invention.
Figure 15B:
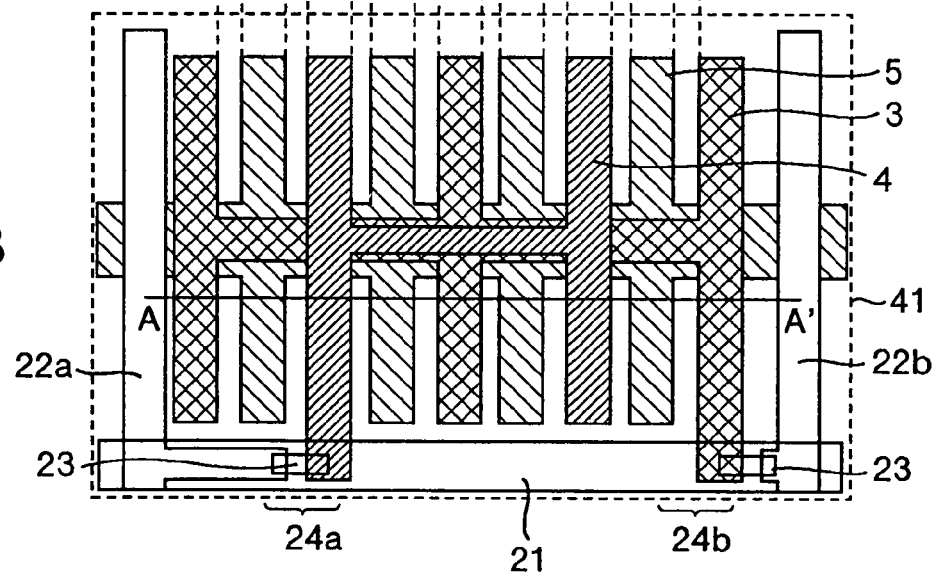

In Embodiment 8 of the liquid crystal display apparatus according to the present invention, the common electrode 3 is located between the first pixel electrode 4 and the second pixel electrode 5 as shown in FIGS. 15A and 15B and is composed of ITO. The first pixel electrode 4 and the second pixel electrode 5 are composed of chromium molybdenum. This liquid crystal display apparatus is the same as that of Embodiment 1 in the other points.

Figure 16A:
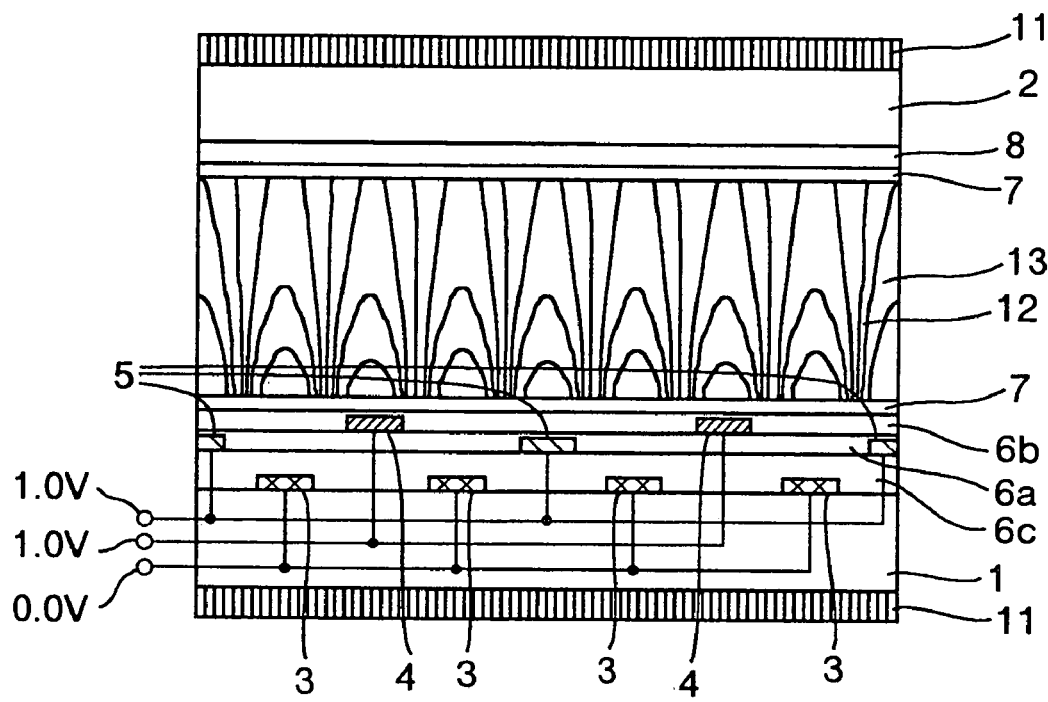
FIGS. 16A and 16B are views useful in explaining control of the distribution of electric fields in the pixel portion according to Embodiment 8 of the liquid crystal display apparatus of the present invention.
Figure 16B:
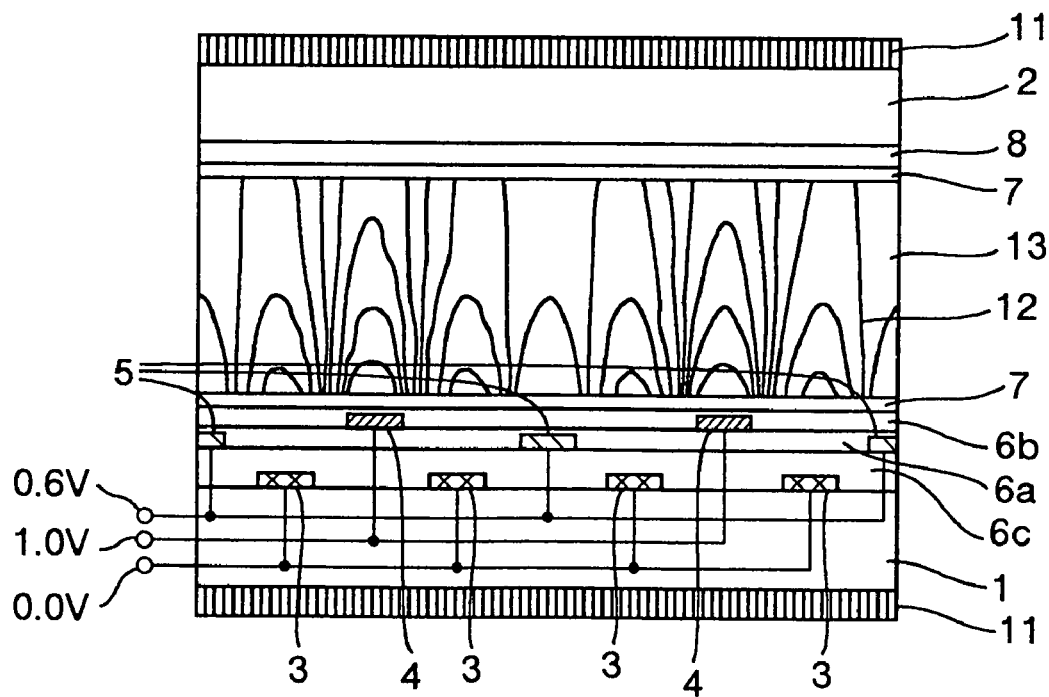

The distribution of electric fields can be controlled by adjusting the ratio of the potentials provided to the common electrode 3, the first pixel electrode 4, and the second pixel electrode 5. Distributions of electric fields obtained by adjusting the ratio of the potentials provided to the common electrode 3, the first pixel electrode 4, and the second pixel electrode 5 will be described with reference to FIGS. 16A and 16B. FIG. 16A shows a distribution of electric fields obtained when potentials are provided to the common electrode 3, the first pixel electrode 4, and the second pixel electrode 5 at a ratio of 0.0:1.0:1.0. Likewise, FIG. 16B shows a distribution of electric fields obtained when potentials are provided to the common electrode 3, the first pixel electrode 4, and the second pixel electrode 5 at a ratio of 0.0:1.0:0.6. In this case, the rate of vertical field components is higher in FIG. 16B than in FIG. 16A. That is, the distribution of electric fields can be adjusted.

As described above, in this embodiment, the vertical and horizontal field components are regulated by providing different potentials to the first and second pixel electrodes 4 and 5 so as to disrupt the symmetry of the distribution of electric fields with respect to a centerline of the common electrode 3 in the longitudinal direction.

In this embodiment, the ratio of the potentials provided to the common electrode 3, the first pixel electrode 4, and the second pixel electrode 5 is determined in the following manner: The driving voltage is varied while keeping the potential at the second pixel electrode 5 equal to the potential at the first pixel electrode 4. Then, a driving voltage with which the image becomes most bluish is determined. At this time, the refractive-index anisotropy of the liquid crystal and the gap in the liquid crystal layer are regulated so as to obtain a desired white. Then, while varying the driving voltage, the potential provided to the second pixel electrode 5 is adjusted by the signal control circuit 36 so as to obtain the desired white. At this time, different potentials are provided to the first and second pixel electrodes 4 and 5 to adjust the ratio of the vertical field components to the horizontal field components. In this manner, the dependence of the chromaticity on the gradation can be restrained.

Embodiment 9

The configuration of Embodiment 9 of the present invention will be described with reference to FIGS. 17A and 17B. FIG. 17B is a bird's eye view useful in explaining the configuration of the pixel 41 on the substrate 1, and FIG. 17A is a sectional view taken along line A·A' in FIG. 17B.

Figure 17A:
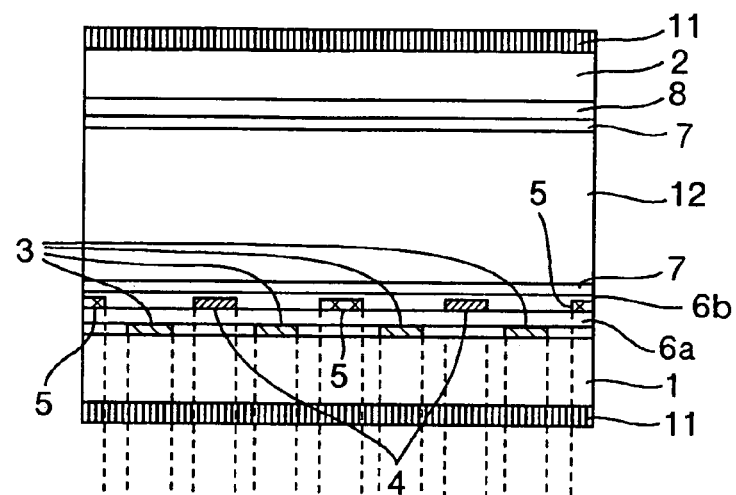
FIGS. 17A and 17B are views showing a sectional configuration of a pixel according to Embodiment 9 of the liquid crystal display apparatus of the present invention.
Figure 17B:
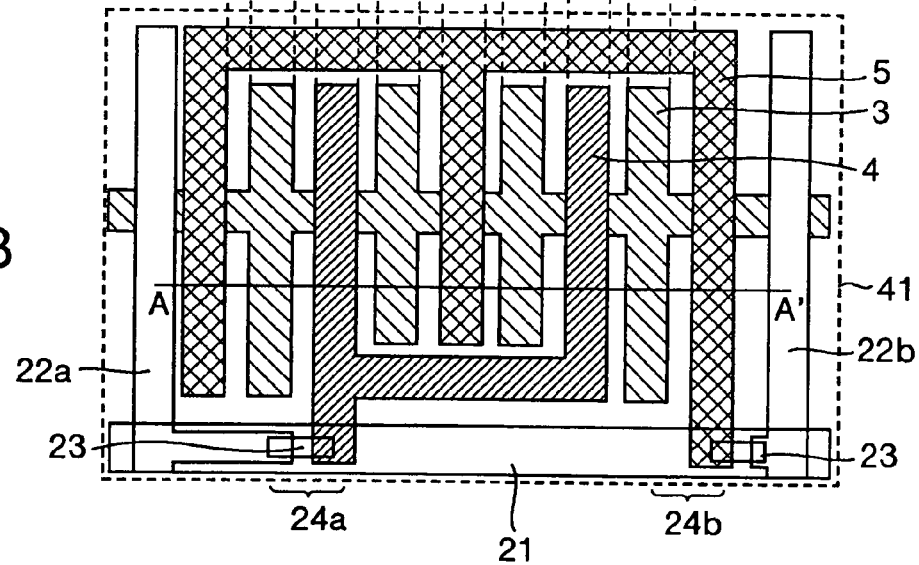

Embodiment 9 of the liquid crystal display apparatus according to the present invention is the same as the liquid crystal display apparatus of Embodiment 1 except for the pixel configuration on the substrate 1, as shown in FIGS. 17A and 17B.

As shown in FIG. 17B, plural pieces of the first pixel electrode 4 are connected together via a first junction, plural pieces of the second pixel electrode 5 are connected together via a second junction, the plural pieces of the first pixel electrode 4 and the first junction do not overlap the plural pieces of the second pixel electrodes 5 and the second junction.

Thus, as shown in FIG. 17A, the first pixel electrode 4 and the second pixel electrode 5 can be arranged in the same layer.

Furthermore, the first pixel electrode 4, the second pixel electrode 5, the first signal line 22a, and the second signal line 22b are arranged in the same layer, and the common electrode 3 and the scanning line 21 are arranged in the same layer.

According to this embodiment, compared to Embodiment 8, the number of insulated layers and thus the number of photolithography steps in the manufacturing process can be reduced.

Embodiment 10

The configuration of Embodiment 10 of the present invention will be described with reference to FIGS. 18A and 18B. FIG. 18B is a bird's eye view useful in explaining the configuration of the pixel 41 on the substrate 1, and FIG. 18A is a sectional view taken along line A–A' in FIG. 18B.

Figure 18A:
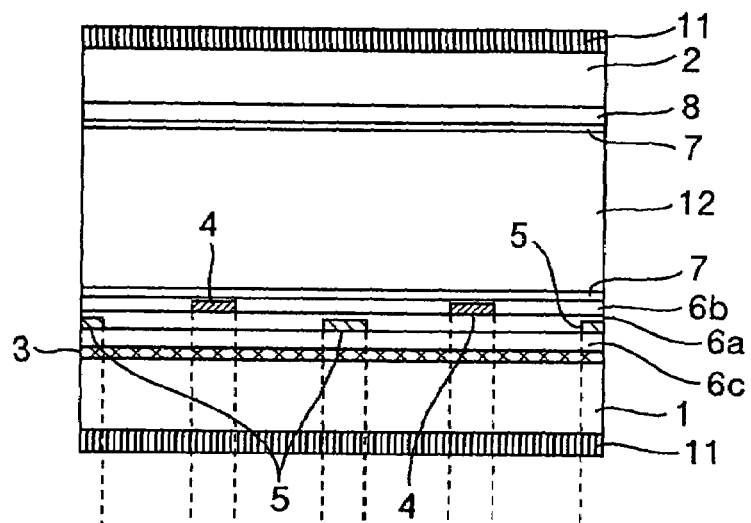
FIGS. 18A and 18B are views showing a sectional configuration of a pixel according to Embodiment 10 of the liquid crystal display apparatus of the present invention.
Figure 18B:
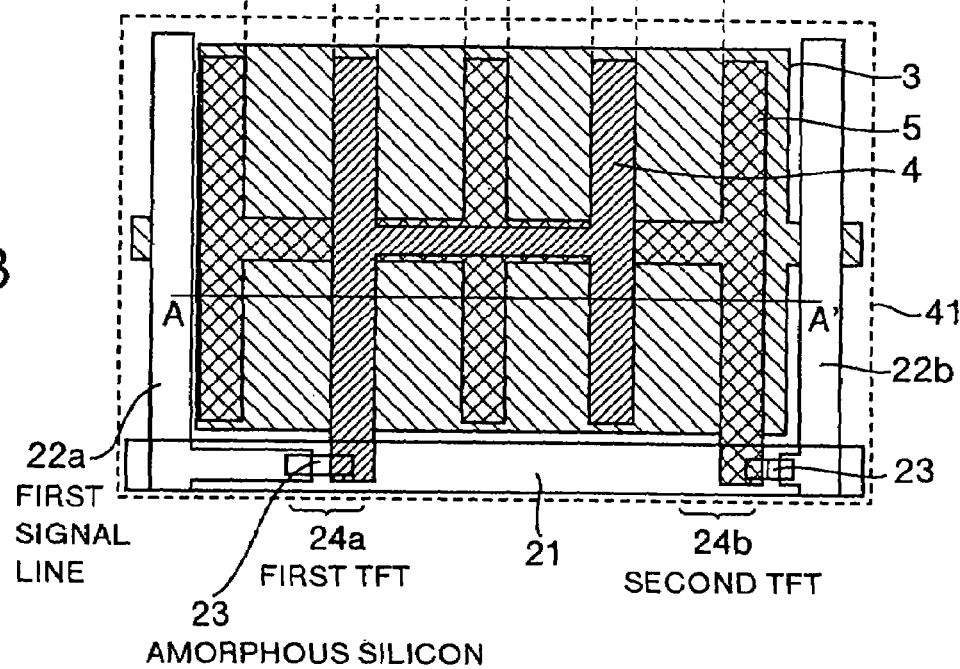

Embodiment 10 of the liquid crystal display apparatus according to the present invention is the same as the liquid crystal display apparatus of Embodiment 8 except that the common electrode 3 is arranged below the first pixel electrode 4 and the second pixel electrode 5 via the insulated film 6c and that the common electrode 3 overlaps the common electrode 3 and the second pixel electrode 5, as shown in FIGS. 18A and 18B.

According to this embodiment, compared to Embodiment 8, the variation of the distribution of electric fields is small even if the mask is misaligned during the manufacturing process. Consequently, this embodiment is unlikely to be affected by the misalignment of the mask.

Further, since the common electrode 3 is arranged below the first and second pixel electrodes 4 and 5, if TFTs of a bottom gate structure are to be produced, the common electrode 3 and the scan line 21 can be formed in the same layer. Consequently, the configuration on the substrate 1 can be produced more easily than in Embodiment 7.

It should be appreciated that the present invention is applicable to the case where the common electrode 3, the first pixel electrode 4, and the second pixel electrode 5 are all formed of a transparent conductive material such as ITO.

Embodiment 11

The configuration of Embodiment 11 of the present invention will be described with reference to FIGS. 19A and 19B. FIG. 19B is a bird's eye view useful in explaining the configuration of the pixel 41 on the substrate 1, and FIG. 19A is a sectional view taken along line A–A' in FIG. 19B.

Figures 19A, 19B:
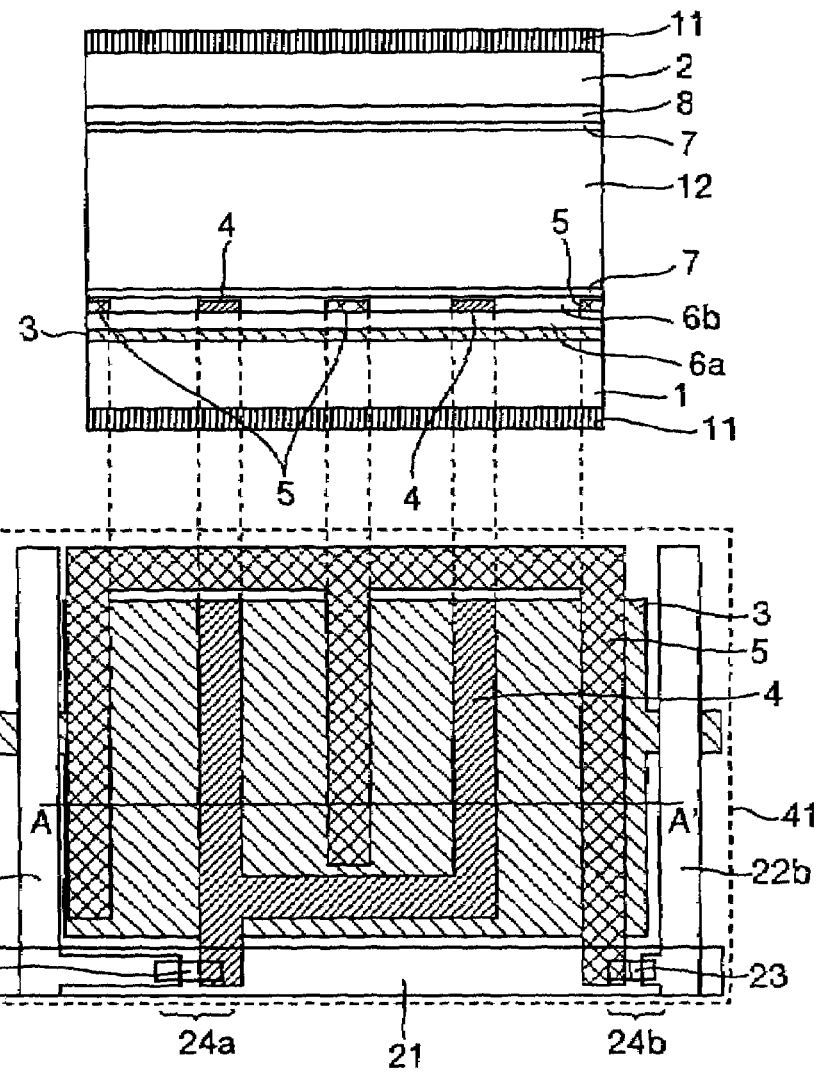
FIGS. 19A and 19B are views showing a sectional configuration of a pixel according to Embodiment 11 of the liquid crystal display apparatus of the present invention.
Figure 20:
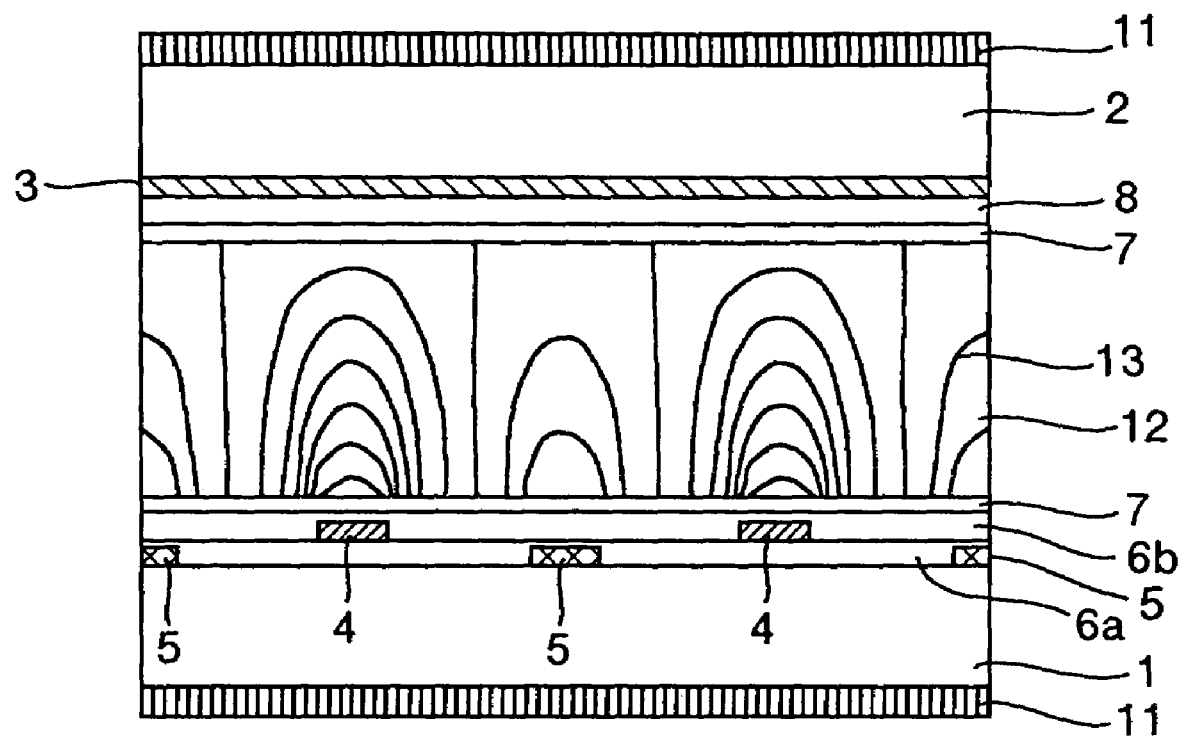
FIG. 20 is a view showing a sectional configuration of a pixel according to Embodiment 12 of the liquid crystal display apparatus of the present invention.

Embodiment 11 of the liquid crystal display apparatus according to the present invention is the same as the liquid crystal display apparatus of Embodiment 10 except for the pixel configuration on the substrate 1, as shown in FIGS. 19A and 19B.

As shown in FIG. 19B, the plural pieces of the first pixel electrode 4 are connected together via a first junction, the plural pieces of the second pixel electrode 5 are connected together via a second junction, the plural pieces of the first pixel electrode 4 and the first junction do not overlap the plural pieces of the second pixel electrode 5 and the second junction.

Thus, as shown in FIG. 19A, the first pixel electrode 4 and the second pixel electrode 5 can be arranged in the same layer.

Furthermore, the first pixel electrode 4, the second pixel electrode 5, the first signal line 22a, and the second signal line 22b are arranged in the same layer, and the common electrode 3 and the scanning line 21 are arranged in the same layer.

According to this embodiment, compared to Embodiment 10, the number of insulated layers and thus the number of photolithography steps in the manufacturing process can be reduced.

Embodiment 12

Embodiment 12 of the liquid crystal display apparatus according to the present invention is the same as the liquid crystal display apparatus of Embodiment 7 except that the common electrode 3 is disposed on the substrate 2 and overlaps the first and second pixel electrodes 4 and 5.

As in this embodiment, even if the electrodes are located on both the substrates 1 and 2, the distribution of electric fields applied to the is liquid crystal is prevented from varying by arranging the electrodes on the substrate 2 so as to overlap all the corresponding electrodes on the substrate 1, even if the substrates 1 and 2 are misaligned. Thus, a desired white can be obtained without the need to adjust the potentials provided to the electrodes for each liquid crystal display apparatus.

In this embodiment, the ratio of the potentials provided to the electrodes is adjusted in the following manner: A potential difference $(x_1-x_2)$ between the first pixel electrode 4 and the second pixel electrode 5 is increased while maintaining the ratio of the potentials at the common electrode 3, the first pixel electrode 4, and the second pixel electrode 5 at $(x_1+x_2)/2:x_1:x_2$, where $x_1$ denotes the potential of the first pixel element 4, and $x_2$ denotes the potential of the second pixel element 5. Then, a potential difference between the first pixel electrode 4 and the second pixel electrode 5 with which the image becomes most bluish is determined. At this time, the refractive-index anisotropy of the liquid crystal and the gap in the liquid crystal layer are regulated so as to obtain the desired white. Then, while varying the potential difference between the first pixel electrode 4 and the second pixel electrode 5, the potential ratio between the common electrode 3 and the first pixel electrode 4 and the second pixel electrode 5 is adjusted by the signal control circuit 36 so as to obtain the desired white. For example, the vertical field components increase when the potential ratio is at $x_1:x_1:x_2$. In this manner, the dependence of the color tones on the gradation can be restrained.

Embodiment 13

Figure 21:
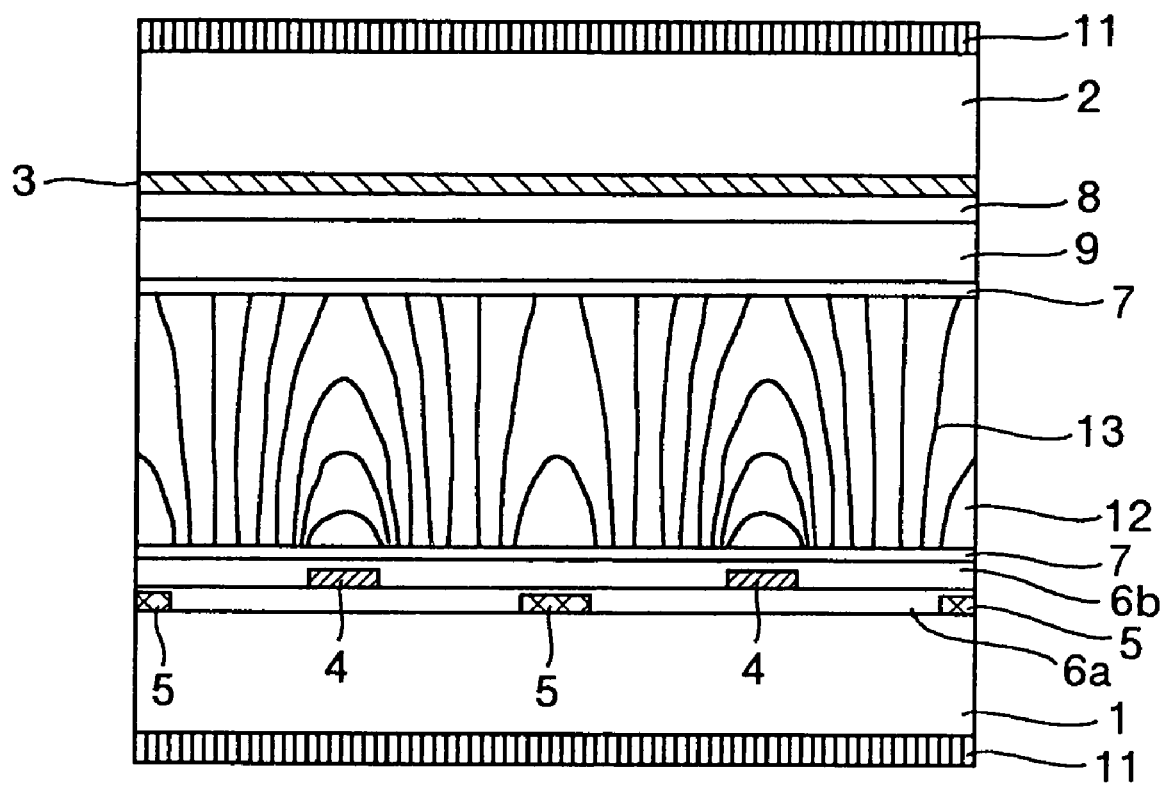
FIG. 21 is a view showing a sectional configuration of a pixel according to Embodiment 13 of the liquid crystal display apparatus of the present invention.

Embodiment 13 of the liquid crystal display apparatus according to the present invention is the same as the liquid crystal display apparatus of Embodiment 12 except that a dielectric 9 of 2 μm thickness is arranged on the second pixel electrode 5 as shown in FIG. 21.

According to this embodiment, compared to Embodiment 12, the horizontal field components in the liquid crystal layer increase as shown by the equipotential lines 13, thereby improving the transmissivity.

Further, the present invention provides the same effect even if the dielectric 9 is a color filter or a flattened film.

Embodiment 14

Figure 22:
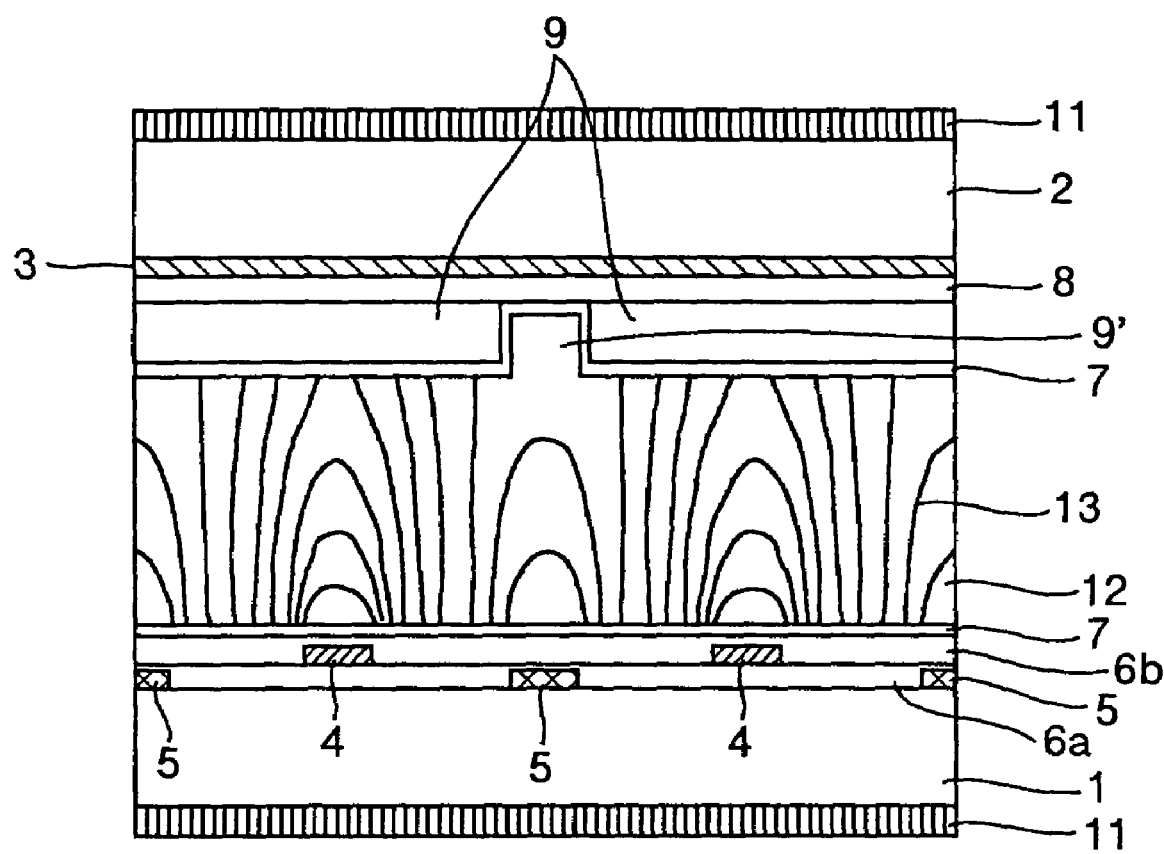
FIG. 22 is a view showing a sectional configuration of a pixel according to Embodiment 14 of the liquid crystal display apparatus of the present invention.

Embodiment 14 of the liquid crystal display apparatus according to the present invention is the same as the liquid crystal display apparatus of Embodiment 13 except that a recess 9' penetrating the dielectric 9 is formed in a portion of the dielectric 9 which overlaps the second pixel electrode 5 as shown in FIG. 22.

In the dielectric 9, an electrode is considered to be present only in the recess 9', so that by processing the recess into an arbitrary shape, a distribution of electric fields similar to the one obtained if an electrode of an arbitrary shape is produced.

In this embodiment, the recess 9' is formed in the dielectric 9 near the center of the pixel. This is equivalent to the arrangement of the common electrode 3 only in the neighborhood of the center of the pixel; the liquid crystal rises toward the location of this recess. Consequently, the liquid crystal rises in all directions to improve the angle of visibility characteristic.

The manner of providing the potentials to the electrodes will be described below in brief.

In the conventional IPS display mode, the color tones monotonously become yellowish as the driving voltage increases. Thus, the liquid crystal need not be raised when the driving voltage is highest. Consequently, with the liquid crystal display apparatus configured as in Embodiment 1, when the driving voltage is lowest, the potential provided to the second pixel electrode 5 may be set equal to the average of the potentials provided to the first pixel electrode 4 and the common electrode 3 so that a distribution of electric fields similar to that obtained in the conventional IPS display mode can be obtained. On the contrary, if the color tones monotonously become bluish as the driving voltage increases, the potential provided to the second pixel electrode 5 may be set equal to the average of the potentials provided to the first pixel electrode 4 and the common electrode 3 when the driving voltage is highest.

Also with the liquid crystal display apparatus configured as described in Embodiment 2 or 7, a distribution of electric fields similar to that obtained in the conventional IPS display mode is obtained when the potential provided to the second pixel electrode 5 is the average of the potentials provided to the first pixel electrode 4 and the common electrode 3. Accordingly, similarly, the potential provided to the second pixel electrode 5 may be set equal to the average of the potentials provided to the first pixel electrode 4 and the common electrode 3 when the driving voltage is highest or lowest.

Likewise, with the liquid crystal display apparatus configured as described in any of Embodiments 3 to 5, when the driving voltage is highest or lowest, the potential provided to the second pixel electrode 5 may be set substantially equal to the potential provided to any one of the first pixel electrode 4 or the common electrode 3, which is overlapped by the second pixel electrode 5, so that a distribution of electric fields similar to that obtained in the conventional IPS display mode can be obtained.

Similarly, with the liquid crystal display apparatus configured as described in Embodiment 8 or 11, when the driving voltage is highest or lowest, the potential provided to the second pixel electrode 5 may be set equal to the potential provided to the first pixel electrode so that a distribution of electric fields similar to that obtained in the conventional IPS display mode can be obtained.

Likewise, with the liquid crystal display apparatus configured as described in any of Embodiments 12 to 14, when the difference between the potentials provided to the first pixel element 4 and to the second pixel element 5 is largest or smallest, the potential provided to the common electrode 3 may be set substantially equal to the average of the potentials provided to the first and second pixel electrodes 4 and 5 so that a distribution of electric fields similar to that obtained in the conventional IPS display mode can be obtained.

According to the present invention, the common electrode, the first pixel electrode, and the second pixel electrode can adjust the distribution of electric fields applied to the liquid crystal, thus providing a liquid crystal display apparatus which can adjust the color tones and which can restrain the variation in the color tones depending on the driving voltage.

The invention claimed is:

1. A liquid crystal display apparatus, comprising:
   a first substrate;
   a second substrate arranged opposite the first substrate;
   a liquid crystal layer sandwiched between the first substrate and the second substrate;
   a plurality of pixels which are sandwiched between the first substrate and the second substrate and form a display section;
   wherein each of the pixels is provided with a first pixel electrode and a second pixel electrode, both of the first and second pixel electrodes corresponding to the pixel, and a common electrode corresponding to the first and second pixel electrodes;
   wherein the first and second pixel electrodes are disposed on the first substrate;
   the first pixel electrodes and the second pixel electrodes have parts which are disposed alternatively within the pixel; and
   wherein the common electrode is disposed between the second substrate and the first and second pixel electrodes so as to be superimposed on the first and second pixel electrodes on an entirety of the second substrate;
   and potential applying means for adjusting a ratio of potentials applied to the common electrode, the first pixel electrode, and the second pixel electrode.

2. A liquid crystal display apparatus according to claim 1, wherein a dielectric is formed between the second pixel electrode and the second substrate.

3. A liquid crystal display apparatus according to claim 2, wherein the dielectric is one of a color filter and a flattened film.

4. A liquid crystal display apparatus according to claim 1, wherein the potential applying means applies potentials independently to the common electrode, the first pixel electrode, and the second pixel electrode, and adjusts the ratio of applied potentials, so as to suppress dependency of color tones on gradation.

* * * * *